United States Patent
Takahashi

(10) Patent No.: US 11,050,512 B2
(45) Date of Patent: Jun. 29, 2021

(54) TRANSMISSION DEVICE, AND TRANSMISSION METHOD

(71) Applicant: SONY CORPORATION, Tokyo (JP)

(72) Inventor: Kazuyuki Takahashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/499,387

(22) PCT Filed: Apr. 24, 2018

(86) PCT No.: PCT/JP2018/016523
§ 371 (c)(1),
(2) Date: Sep. 30, 2019

(87) PCT Pub. No.: WO2018/207610
PCT Pub. Date: Nov. 15, 2018

(65) Prior Publication Data
US 2020/0059319 A1 Feb. 20, 2020

(30) Foreign Application Priority Data
May 8, 2017 (JP) .............................. JP2017-092415

(51) Int. Cl.
*H04L 1/00* (2006.01)
*H04B 7/26* (2006.01)
(Continued)

(52) U.S. Cl.
CPC ......... *H04L 1/0083* (2013.01); *H04B 7/2656* (2013.01); *H04L 1/0007* (2013.01);
(Continued)

(58) Field of Classification Search
CPC ...... H04L 1/0083; H04L 1/0007; H04L 69/28
See application file for complete search history.

(56) References Cited

U.S. PATENT DOCUMENTS 5,537,398 A * 7/1996 Siwiak .................. H04H 20/33
370/204
6,522,665 B1 * 2/2003 Suzuki .................. G11B 20/12
370/471
(Continued)

FOREIGN PATENT DOCUMENTS

CA       2980689 A1    12/2016
CN     102422614 A     4/2012
(Continued)

OTHER PUBLICATIONS

"Transmission System for Digital Terrestrial Television Broadcasting", Arib Standard-B31, Version 22, Association of Radio Industries and Businesses, Mar. 18, 2014, 233 pages.
(Continued)

*Primary Examiner* — Steve N Nguyen
(74) *Attorney, Agent, or Firm* — Chip Law Group

(57) ABSTRACT

The present technology relates to a transmission device and a transmission method, each of which enables to efficiently transfer time information. A physical-layer frame is generated on the basis of an FEC frame obtained from input data. A transmission device that transmits a physical-layer frame includes, in a top area of the physical-layer frame, time information indicating the time of a starting position of the top area, which enables to efficiently transfer the time information. The present technology can be applied to, for example, data transfer corresponding to a predetermined broadcasting method.

11 Claims, 20 Drawing Sheets

(51) Int. Cl.
*H04L 5/00* (2006.01)
*H04L 27/26* (2006.01)
*H04L 29/06* (2006.01)

(52) U.S. Cl.
CPC .......... *H04L 5/0007* (2013.01); *H04L 5/0057* (2013.01); *H04L 27/2656* (2013.01); *H04L 69/28* (2013.01)

(56) References Cited

U.S. PATENT DOCUMENTS

| | | | |
|---|---|---|---|
| 2010/0112974 A1* | 5/2010 | Sahai | H04W 52/0229 455/334 |
| 2010/0232544 A1 | 9/2010 | Myung et al. | |
| 2016/0088321 A1* | 3/2016 | Tsukagoshi | H04N 21/2387 725/25 |
| 2016/0099026 A1* | 4/2016 | Iguchi | G11B 27/102 386/241 |
| 2016/0205441 A1 | 7/2016 | Iguchi et al. | |
| 2017/0118317 A1* | 4/2017 | Hasegawa | H04J 3/06 |
| 2017/0207869 A1* | 7/2017 | Iguchi | H04H 20/95 |
| 2018/0077471 A1 | 3/2018 | Takahashi et al. | |
| 2019/0305886 A1* | 10/2019 | Baek | H04L 1/0071 |

FOREIGN PATENT DOCUMENTS

| | | |
|---|---|---|
| CN | 105519020 A | 4/2016 |
| CN | 107771397 A | 3/2018 |
| EP | 2237514 A1 | 10/2010 |
| EP | 3054608 A1 | 8/2016 |
| EP | 3304774 A1 | 4/2018 |
| JP | 2012-520047 A | 8/2012 |
| JP | 2015-070609 A | 4/2015 |
| JP | 2016-225906 A | 12/2016 |
| KR | 10-2010-0103019 A | 9/2010 |
| KR | 10-2018-0015119 A | 2/2018 |
| TW | 201119305 A | 6/2011 |
| WO | 2010/104359 A2 | 9/2010 |
| WO | 2015/045362 A | 4/2015 |
| WO | 2016/194326 A1 | 12/2016 |

OTHER PUBLICATIONS

"Transmission System for Advanced Wide Band Digital Satellite Broadcasting", Arib Standard-B44, Version 2.0, Association of Radio Industries and Businesses, Jul. 31, 2014, 173 pages.

International Search Report and Written Opinion of PCT Application No. PCT/JP2018/016523, dated Jul. 31, 2018, 08 pages of ISRWO.

* cited by examiner

FIG. 5

| CR | N_ldpc [bits] | N_bch [bits] | BCH [bits] | K_bch [bits] | K_bch [B] | Num Bits |
|---|---|---|---|---|---|---|
| 2/16 | 276480 | 34560 | 768 | 33792 | 4224 | 13 |
| 3/16 | 276480 | 51840 | 768 | 51072 | 6384 | 13 |
| 4/16 | 276480 | 69120 | 768 | 68352 | 8544 | 14 |
| 5/16 | 276480 | 86400 | 768 | 85632 | 10704 | 14 |
| 6/16 | 276480 | 103680 | 768 | 102912 | 12864 | 14 |
| 7/16 | 276480 | 120960 | 768 | 120192 | 15024 | 14 |
| 8/16 | 276480 | 138240 | 768 | 137472 | 17184 | 15 |
| 9/16 | 276480 | 155520 | 768 | 154752 | 19344 | 15 |
| 10/16 | 276480 | 172800 | 768 | 172032 | 21504 | 15 |
| 11/16 | 276480 | 190080 | 768 | 189312 | 23664 | 15 |
| 12/16 | 276480 | 207360 | 768 | 206592 | 25824 | 15 |
| 13/16 | 276480 | 224640 | 768 | 223872 | 27984 | 15 |
| 14/16 | 276480 | 241920 | 768 | 241152 | 30144 | 15 |

FIG. 9

| Syntax | No. of bits | format | Semantics |
|---|---|---|---|
| Time_Info () { | | | |
| leap_indicator | 2 | uimsbf | LEAP SECOND DESIGNATOR |
| Reserved | 6 | bslbf | FUTURE RESERVATION |
| NTP_transmit_timestamp | 64 | uimsbf | NTP TIME INFORMATION |
| } | | | |

FIG. 15

| Syntax | No. of bits | format | Semantics |
|---|---|---|---|
| Time_Info (){ | | | |
| Time_Info_Flag | 1 | bslbf | FLAG INDICATING THAT TIME INFORMATION IS INCLUDED |
| leap_indicator | 2 | uimsbf | LEAP SECOND DESIGNATOR |
| NTP_transmit_timestamp | 64 | uimsbf | NTP TIME INFORMATION |
| } | | | |

FIG. 18

| Syntax | No. of bits | format | Semantics |
|---|---|---|---|
| Time_Info () { | | | |
| Time_Info_Flag | 1 | bslbf | FLAG INDICATING THAT TIME INFORMATION IS INCLUDED |
| } | | | |

…

TRANSMISSION DEVICE, AND TRANSMISSION METHOD

CROSS REFERENCE TO RELATED APPLICATIONS

This application is a U.S. National Phase of International Patent Application No. PCT/JP2018/016523 filed on Apr. 24, 2018, which claims priority benefit of Japanese Patent Application No. JP 2017-092415 filed in the Japan Patent Office on May 8, 2017. Each of the above-referenced applications is hereby incorporated herein by reference in its entirety.

TECHNICAL FIELD

The present technology relates to a transmission device and a transmission method, and in particular, relates to a transmission device and a transmission method, each of which is enabled to efficiently transfer time information.

BACKGROUND ART

For example, as a broadcasting method of terrestrial digital television broadcasting, there is Integrated Services Digital Broadcasting-Terrestrial (ISDB-T) employed by, for example, Japan (refer to, for example, non-patent document 1).

In addition, with respect to digital television broadcasting, it is known that information of the time prescribed by Network Time Protocol (NTP) (NTP time information) is used as time information used to cause the transmission side and the receiving side to be synchronized with each other (refer to, for example, non-patent document 2).

CITATION LIST

Non-Patent Document

Non-patent Document 1: ARIB STD-B31 ver. 2.2, Association of Radio Industries and Businesses
Non-patent Document 2: ARIB STD-B44 ver. 2.1, Association of Radio Industries and Businesses

SUMMARY OF THE INVENTION

Problems to be Solved by the Invention

Incidentally, in Japan, how to sophisticate terrestrial digital television broadcasting for the next generation is being examined. However, with respect to the next-generation terrestrial digital television broadcasting, a method for transferring time information such as NTP time information is not developed, and a proposal for efficiently transferring time information is being requested.

The present technology has been devised in consideration of such a situation, and enables to efficiently transfer time information.

Solutions to Problems

A transmission device according to an aspect of the present technology includes: a generation unit that generates a physical-layer frame on the basis of a forward error correction (FEC) frame obtained from input data; and a transmission unit that transmits the physical-layer frame, in which a top area of the physical-layer frame includes time information indicating time of a starting position of the top area.

A transmission device according to an aspect of the present technology may be an independent device, or may be an internal block that forms one device. In addition, a transmission method according to an aspect of the present technology is a transmission method corresponding to the above-described transmission device according to an aspect of the present technology.

In a transmission device and a transmission method according to an aspect of the present technology, a physical-layer frame is generated on the basis of a forward error correction (FEC) frame obtained from input data, and the physical-layer frame is transmitted. In addition, a top area of the physical-layer frame includes time information indicating the time of a starting position of the top area.

Effects of the Invention

According to an aspect of the present technology, time information can be efficiently transferred.

It should be noted that the effects described herein are not necessarily limited, and may be any one of the effects described in the present disclosure.

BRIEF DESCRIPTION OF DRAWINGS

FIG. 5 is a drawing illustrating a maximum value of a top TLV packet position pointer determined in a case where a baseband frame size is a long code.

FIG. 9 is a drawing illustrating an example of syntax of time information included in an FEC block header.

FIG. 15 is a drawing illustrating an example of syntax of time information included in an OFDM frame header.

FIG. 18 is a drawing illustrating an example of syntax of time information included in an OFDM frame header.

MODE FOR CARRYING OUT THE INVENTION

Figure 1:
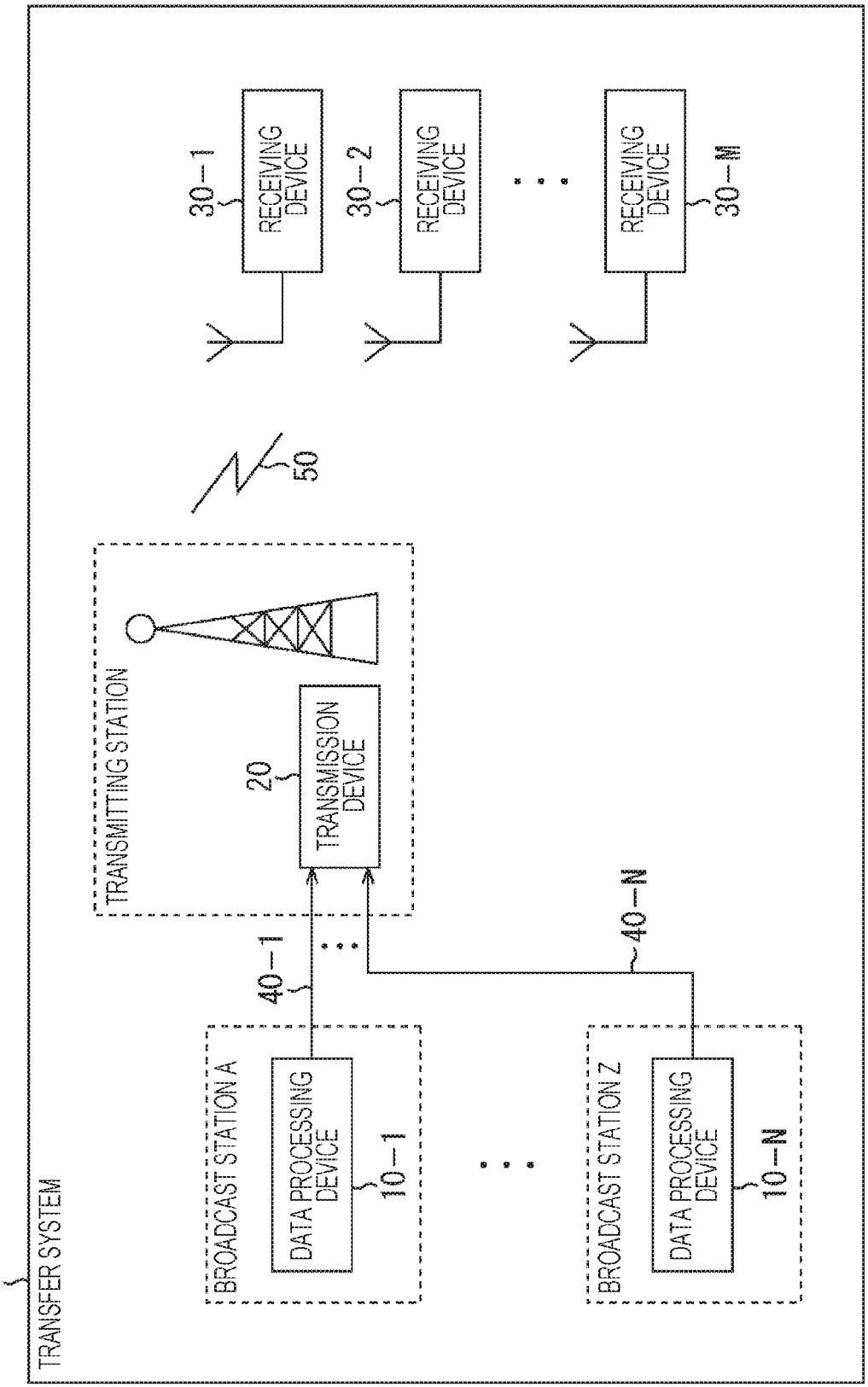
FIG. 1 is a block diagram illustrating a configuration of an embodiment of a transfer system to which the present technology is applied.

Embodiments of the present technology will be described below with reference to the drawings. It should be noted that explanations are made in the following order.
1. Configuration of system
2. Outline of the present technology
3. Detailed content of the present technology
(1) FEC block header method
(1-1) First FEC block header method
(1-2) Second FEC block header method
(2) OFDM frame header method
(2-1) First OFDM frame header method
(2-2) Second OFDM frame header method
4. Operation on the transmission side
5. Modified examples
6. Configuration of computer

1. Configuration of System (Configuration Example of Transfer System)

FIG. 1 is a block diagram illustrating a configuration of an embodiment of a transfer system to which the present technology is applied. It should be noted that a system means an aggregate into which a plurality of devices is logically put together.

In FIG. 1, the transfer system 1 includes: data processing devices 10-1 to 10-N (N is an integer that is larger than or equal to 1) that are installed in facilities related to each broadcast station; a transmission device 20 that is installed in a transmitting station; and receiving devices 30-1 to 30-M (M is an integer that is larger than or equal to 1) that are possessed by users.

In addition, in this transfer system 1, the data processing devices 10-1 to 10-N are connected to the transmission device 20 through communication lines 40-1 to 40-N respectively. Incidentally, for example, exclusive lines can be used as the communication lines 40-1 to 40-N.

The data processing device 10-1 processes a content such as a broadcast program produced by a broadcast station A, and transmits transfer data obtained as a result thereof to the transmission device 20 through the communication line 40-1.

As with the data processing device 10-1, the data processing devices 10-2 to 10-N process a content such as broadcast programs produced by each broadcast station such as a broadcast station B and a broadcast station Z, and transmits transfer data obtained as a result thereof to the transmission device 20 through the communication lines 40-2 to 40-N.

The transmission device 20 receives transfer data transmitted from the data processing devices 10-1 to 10-N on the broadcast station side through the communication line 40-1 to 40-N. The transmission device 20 processes transfer data received from the data processing devices 10-1 to 10-N, and transmits broadcast signals obtained as a result thereof from a transmission antenna installed in the transmitting station.

As the result, the broadcast signals from the transmission device 20 on the transmitting station side are transmitted to the receiving devices 30-1 to 30-M through a broadcast transfer path 50.

The receiving devices 30-1 to 30-M are fixed receivers such as a television receiver, a set top box (STB), a recorder, a game machine, and a network storage, or mobile receivers such as a smart phone, a portable telephone, and a tablet type computer. In addition, the receiving devices 30-1 to 30-M may be, for example, vehicle-mounted on-board devices such as an on-board television set, or wearable computers such as a head mounted display (HMD).

The receiving device 30-1 receives and processes a broadcast signal transmitted from the transmission device 20 through the broadcast transfer path 50, and consequently reproduces a content such as a broadcast program corresponding to user's channel selection operation.

As with the receiving device 30-1, the receiving devices 30-2 to 30-M each process a broadcast signal from the transmission device 20, and each reproduce a content corresponding to user's channel selection operation.

Incidentally, the transfer system 1 will be described on the assumption that the broadcast transfer path 50 is based on terrestrial signals (terrestrial broadcasting). However, the broadcast transfer path 50 may be based on not only terrestrial signals, but also, for example, satellite broadcasting that uses a broadcasting satellite (BS) or a communications satellite (CS), or common antenna television (CATV) using a cable.

In addition, although not illustrated, the transfer system 1 may be adapted to have a function of communicating through a communication line such as the Internet so as to allow connections to various servers, and consequently the receiving devices 30-1 to 30-M, each having a communication function, are capable of receiving various data, such as contents and applications, by accessing the various servers for two-way communication through the communication line such as the Internet.

It should be noted that in the following explanations, in a case where it is not particularly necessary to distinguish the data processing devices 10-1 to 10-N on the broadcast station side, the data processing devices 10-1 to 10-N are referred to as "data processing device 10". In addition, in a case where it is not particularly necessary to distinguish the receiving devices 30-1 to 30-M, the receiving devices 30-1 to 30-M are referred to as "receiving device 30".

(Configuration of Device on the Transmission Side)

Figure 2:
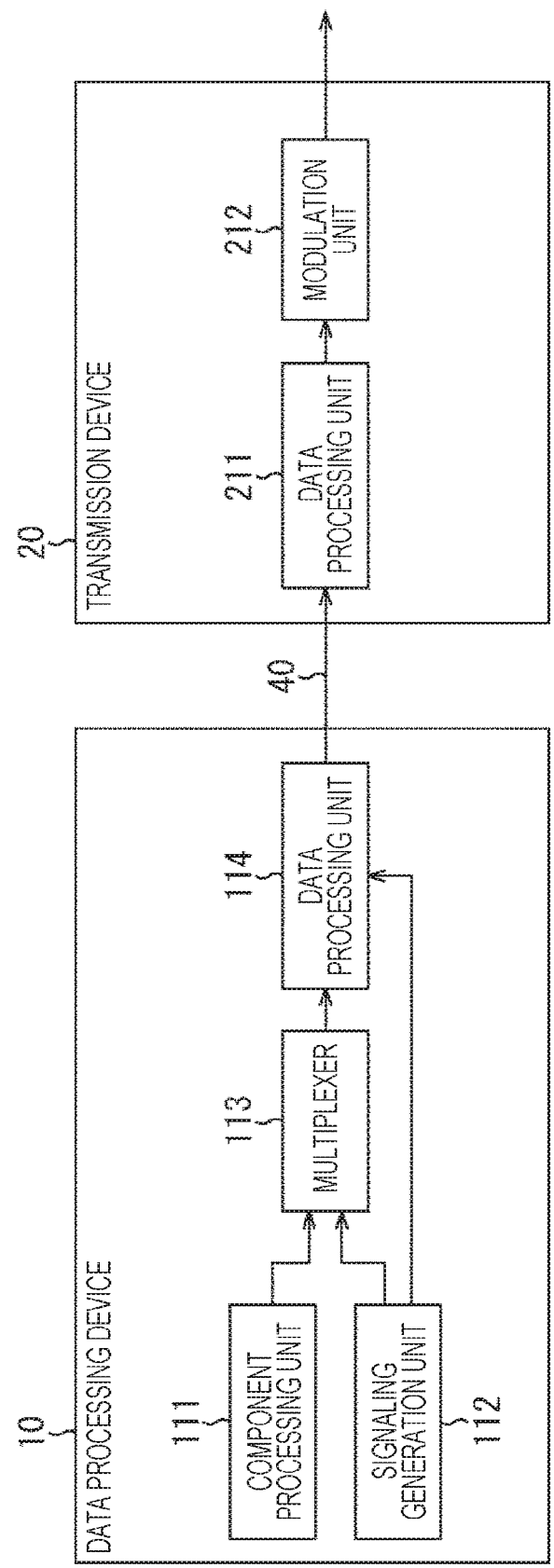
FIG. 2 is a block diagram illustrating a configuration example of a data processing device and a transmission device.

FIG. 2 is a block diagram illustrating an example of a configuration of the data processing device 10 and the transmission device 20 in FIG. 1.

In FIG. 2, the data processing device 10 includes a component processing unit 111, a signaling generation unit 112, a multiplexer 113, and a data processing unit 114.

The component processing unit 111 processes data of components that form a content such as a broadcast program, and supplies a stream of the components, which is obtained as a result thereof, to the multiplexer 113. Here, the data of components is, for example, data such as video, audio, and a subtitle. These pieces of data are subjected to, for example, processing such as encoding processing that conforms to a predetermined encoding method.

The signaling generation unit 112 generates signaling used in higher-layer processing that includes channel selection and reproduction of a content, and supplies the signaling to the multiplexer 113. In addition, the signaling generation unit 112 generates signaling used in physical-layer processing that includes modulation and demodulation of a broadcast signal, and supplies the signaling to the data processing unit 114.

It should be noted that the signaling is also referred to as "control information". In addition, in the following explanations, among several kinds of signaling, signaling used in physical-layer processing is referred to as "physical-layer signaling" (L1 signaling), whereas signaling used in upper-layer processing is referred to as "upper-layer signaling" so as to distinguish therebetween, the upper-layer being more upper than the physical layer.

The multiplexer 113 multiplexes a stream of components supplied from the component processing unit 111 and a stream of upper-layer signaling supplied from the signaling generation unit 112, and supplies a stream obtained as a result thereof to the data processing unit 114. It should be noted that other streams such as time information and an application may be multiplexed here.

The data processing unit 114 processes the stream supplied from the multiplexer 113, and generates a packet (frame) in a predetermined format. In addition, the data processing unit 114 processes the packet in the predetermined format and the physical-layer signaling from the signaling generation unit 112 to generate transfer data, and transmits the transfer data to the transmission device 20 through the communication line 40.

In FIG. 2, the transmission device 20 includes a data processing unit 211 and a modulation unit 212.

The data processing unit 211 receives and processes transfer data transmitted from the data processing device 10 through the communication line 40, and extracts a packet (frame) obtained as a result thereof, the packet being in a predetermined format, and extracts physical-layer signaling information.

The data processing unit 211 processes the packet (frame) in the predetermined format and the physical-layer signaling information to generate a physical-layer frame (physical-layer frame) that conforms to a predetermined broadcasting method, and supplies the physical-layer frame to the modulation unit 212.

The modulation unit 212 subjects the physical-layer frame supplied from the data processing unit 211 to required processing (for example, modulation processing), and transmits a broadcast signal (RF signal) obtained as a result thereof from the transmission antenna installed in the transmitting station.

Incidentally, in Japan, examination of how to sophisticate terrestrial digital television broadcasting for the next generation has started. Here, as a physical-layer frame that conforms to a broadcasting method of this next-generation terrestrial digital television broadcasting (next-generation ISDB-T), an orthogonal frequency division multiplexing (OFDM) frame that uses an orthogonal frequency division multiplexing method as a modulation method can be generated.

In addition, in the explanation of the configuration in FIG. 2, the physical-layer signaling is generated on the data processing device 10 side, and is then transmitted to the transmission device 20. However, the physical-layer signaling may be generated on the transmission device 20 side.

The data processing device 10 and the transmission device 20 are configured as described above.

2. Outline of the Present Technology

Incidentally, with respect to the broadcasting method of the next-generation terrestrial digital television broadcasting (next-generation ISDB-T), data transfer that uses a type-length value (TLV) packet is being examined as a transfer packet. The TLV packet is a variable-length packet, and has a size of, for example, 4 to 65536 bytes. It should be noted that the TLV packet is also disclosed in the above-described non-patent document 2.

In addition, the transfer packet such as the TLV packet is transferred by being encapsulated in an error correction block such as a forward error correction (FEC) block.

(Configuration of FEC Block)

Figure 3:
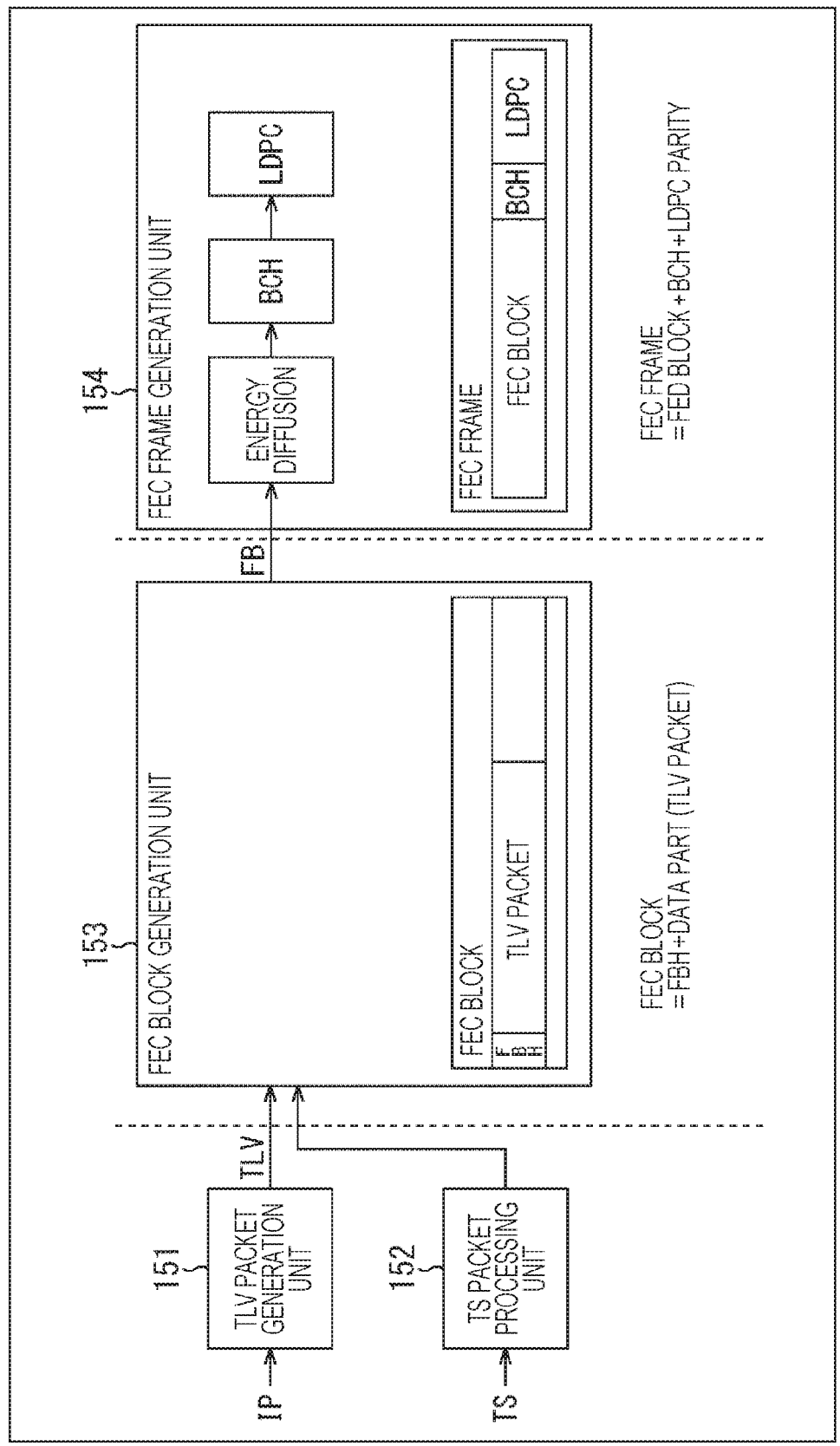
FIG. 3 is a drawing illustrating an example of a configuration of a block related to generation of an FEC block.

FIG. 3 is a drawing illustrating an example of a configuration of a block related to generation of an FEC block.

As shown in FIG. 3, as blocks related to generation of an FEC block on the transmission side, a TLV packet generation unit 151, a TS packet processing unit 152, an FEC block generation unit 153, and an FEC frame generation unit 154 are included. However, each block of the TLV packet generation unit 151 to the FEC frame generation unit 154 is included in either of (the data processing unit 114 (FIG. 2)) of the data processing device 10 and (the data processing unit 211 (FIG. 2)) of the transmission device 20.

The TLV packet generation unit 151 processes an Internet Protocol (IP) stream input therein to generate a TLV packet, and supplies the TLV packet to the FEC block generation unit 153. Here, the TLV packet includes, for example, the IP packet and control information (upper-layer signaling). In addition, the IP packet includes a User Datagram Protocol (UDP) packet. Hereinafter, an IP packet that includes a UDP packet is also referred to as "UDP/IP packet".

The TS packet processing unit 152 processes a TS stream (MPEG2-TS stream) input therein to generate a TS packet, and supplies the TS packet to the FEC block generation unit 153. As processing for this TS stream, for example, processing such as deletion of a synchronization byte is performed.

The TLV packet from the TLV packet generation unit 151, or the TS packet from the TS packet processing unit 152, is supplied to the FEC block generation unit 153. The FEC block generation unit 153 processes the TLV packet or the TS packet to generate an FEC block, and supplies the FEC block to the FEC frame generation unit 154.

Here, the FEC block includes an FEC block header (FBH), and a data part. The TLV packet or the TS packet is arranged in the data part. Here, a case where (a part or all) of one or more TLV packets is arranged will be described. In addition, since the TLV packet is a variable-length packet, there is a case where a TLV packet arranged in a certain FEC block will be arranged extending over the next FEC block.

It should be noted that data that is arranged in the data part of the FEC block is not limited to input packets (transfer packets) such as the TLV packet and the TS packet. For example, input streams (transfer stream) such as the IP stream and the TS stream may be arranged in the data part of the FEC block.

The FEC frame generation unit 154 subjects an FEC block supplied from the FEC block generation unit 153 to processing, such as energy diffusion, Bose-Chaudhuri-Hocquenghem (BCH) encoding, and low density parity check (LDPC) encoding, to generate an FEC frame, and supplies the FEC frame to a subsequent stage.

Here, the FEC frame is formed by adding parities of BCH code and LDPC code to one FEC block. In other words, the variable-length TLV packet is encapsulated in a fixed-length FEC block, and subsequently, further, parities of BCH code and LDPC code are added to the FEC block, and the FEC block is then stored in a fixed-length FEC frame.

(Flow of Generation of FEC Block)

Figure 4:
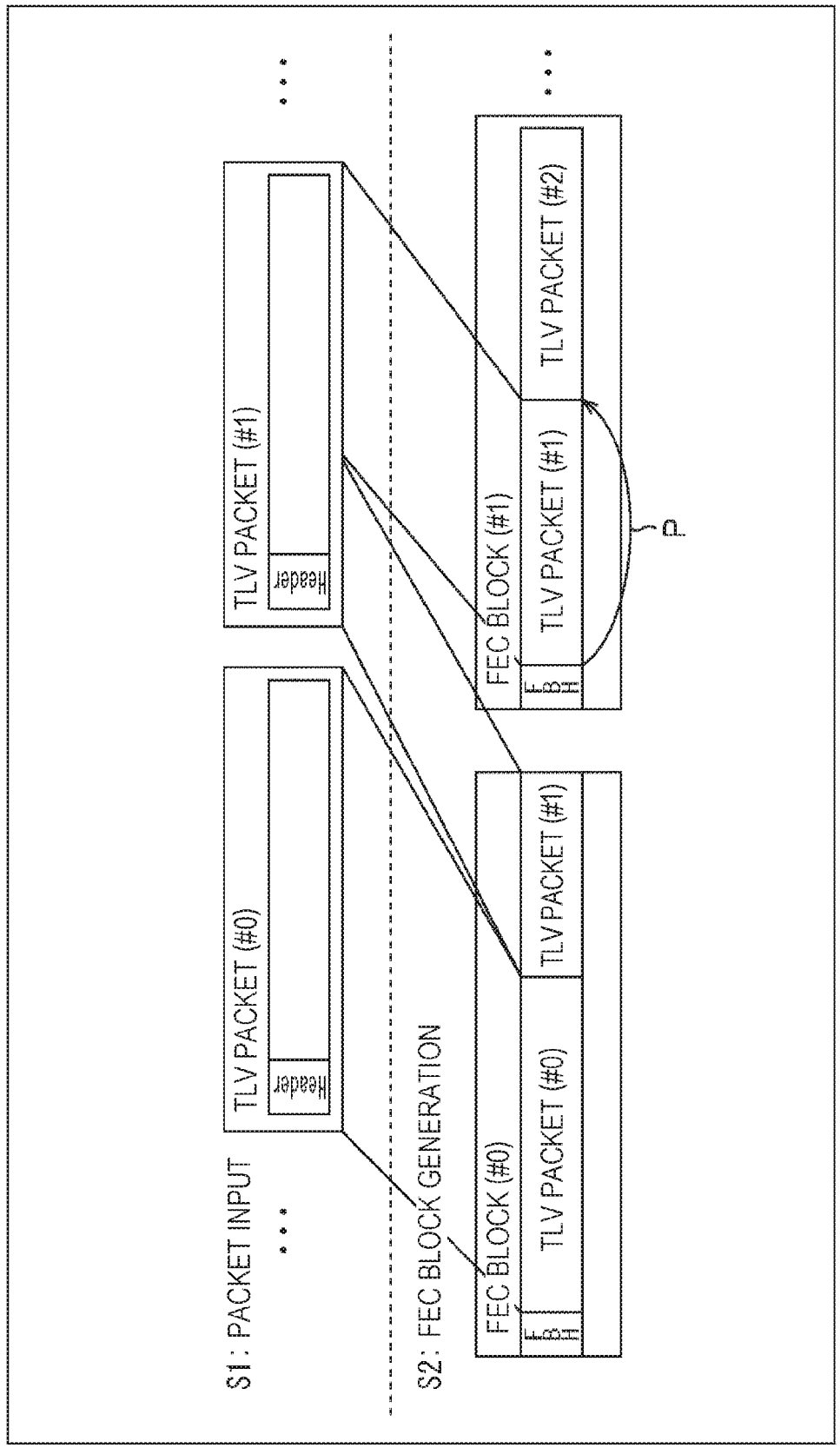
FIG. 4 is a drawing illustrating a flow of generation of an FEC block.

FIG. 4 is a drawing illustrating a flow of generation of an FEC block. It should be noted that in FIG. 4, the time passes in a direction from the left side toward the right side in the figure.

In the FEC block generation unit 153 (FIG. 3), when a TLV packet generated by the TLV packet generation unit 151 (FIG. 3) is input (S1), an FEC block header (FBH) is added to the TLV packet, and an FEC block is generated (S2). Incidentally, although not illustrated, subsequently, the FEC block obtained in this manner is subjected to energy diffusion.

Here, if attention is paid to the top FEC block #0 among FEC blocks generated by the FEC block generation processing in the step S2, a part of data of a TLV packet #1 is arranged subsequent to (all data of) a TLV packet #0 in the FEC block #0. In addition, if attention is paid to the next FEC block #1, data of a TLV packet #2 is arranged subsequent to remaining data of the TLV packet #1, the data of which has been partially arranged in the FEC block #0, in the FEC block #1.

In other words, the TLV packet #1 is arranged extending over the top FEC block #0 and the FEC block #1 subsequent thereto. In this case, with respect to the FEC block #1, it is preferable that a starting position (starting position) of the TLV packet #2 that is arranged subsequent to remaining data of the TLV packet #1 (the TLV packet #1 that is arranged extending over the FEC block #0 and the FEC block #1) is reliably notified so as to reliably extract the TLV packet in the FEC block.

Accordingly, here, in the FEC block, a pointer indicating a position of the top TLV packet (hereinafter referred to as "top TLV packet position pointer") is arranged in an FEC block header (FBH) of the FEC block. Consequently, this top TLV packet position pointer enables to reliably identify a position (starting position P in the figure) of the top TLV packet.

It should be noted that in a case where the top TLV packet position pointer is not arranged in the FEC block header (FBH) of the FEC block, when synchronization information cannot be obtained due to some kind of cause such as a receiving mistake on the receiver side, there is a possibility that it will not be possible to normally extract and process the TLV packet, and consequently data will be interrupted.

Meanwhile, as shown in FIG. 4, in a case where the top TLV packet position pointer is arranged in the FEC block header (FBH) of the FEC block, it is possible to reliably identify a position of the top TLV packet by the top TLV packet position pointer on an FEC block basis on the receiver side, and consequently it is always possible to normally extract and process the TLV packet. Therefore, data interruption can be suppressed.

In addition, the number of bits assigned to the top TLV packet position pointer can be set at an arbitrary value according to a data configuration or the like. For example, the maximum value of the top TLV packet position pointer is determined according to a baseband frame size; therefore, is only required the number of bits assigned to the top TLV packet position pointer should be determined corresponding thereto.

(Maximum Value of Pointer of Long Code)

FIG. 5 is a drawing illustrating a maximum value of a top TLV packet position pointer determined in a case where a baseband frame size is a long code (code length: 276480 bits).

In FIG. 5, CR (coding rate) represents a coding rate of an LDPC code, N_ldpc represents an LDPC code block (unit: bit), and N_bch represents a BCH code block (unit: bit).

Figure 6:
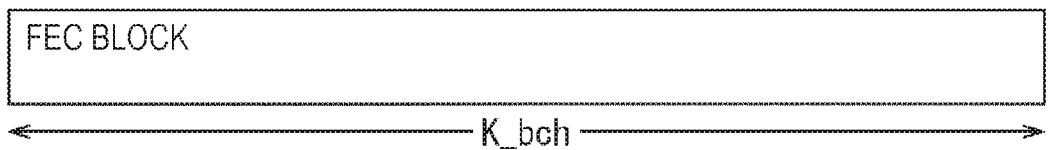
FIG. 6 is a drawing illustrating K_bch corresponding to an FEC block.

In addition, in FIG. 5, BCH represents N_bch-K_bch (unit: bit), K_bch represents a BCH information block (unit: bit, byte), and Num Bits represents the number of bits required according to K_bch (B: byte). It should be noted that as shown in FIG. 6, K_bch is equivalent to the FEC block length.

As shown in FIG. 5, in the case of the long code in which N_ldpc=276480 bits, when the coding rate (CR) of the LDPC code is 2/16, 3/16, the number of bits (Num Bits) is 13 bits, when the coding rate (CR) of the LDPC code is 4/16, 5/16, 6/16, 7/16, the number of bits (Num Bits) is 14 bits, and when the coding rate (CR) of the LDPC code is 8/16, 9/16, 10/16, 11/16, 12/16, 13/16, 14/16, the number of bits (Num Bits) is 15 bits.

In this manner, in the case of the long code in which the code length is 276480 bits, when CR=14/16, which is the maximum coding rate, the number of bits (Num Bits) is 15 bits, and therefore the maximum value of the top TLV packet position pointer is 15 bits. In addition, by including this top TLV packet position pointer in the FEC block header, in a case where a variable-length TLV packet is arranged in an FEC block, a position of the top TLV packet can be reliably identified.

In addition, with respect to the broadcasting method of the next-generation terrestrial digital television broadcasting (next-generation ISDB-T), a method for transferring time information is not developed, and a proposal for efficiently transferring time information is being requested as described above.

In the present technology, by including, in the top area of a physical-layer frame such as an OFDM frame, time information indicating the time of the starting position of the top area, efficient transfer of the time information is realized. As embodiments of the present technology, an FEC block header method that uses an FEC block header added to an FEC block, and an OFDM frame header method that uses an OFDM frame header added to an OFDM frame, will be described below.

3. Detailed Content of the Present Technology (1) FEC Block Header Method

As the FEC block header method in which time information is transferred by using an FEC block header, there are a method in which time information is included in an FEC block header, and a method in which time information is included in a TLV packet. Hereinafter, the former is referred to as a first FEC block header method, and the latter is referred to as a second FEC block header method. The first and second FEC block header methods will be described in order.

(1-1) First FEC Block Header Method (Example of the Sending Timing of Time Information)

Figure 7:
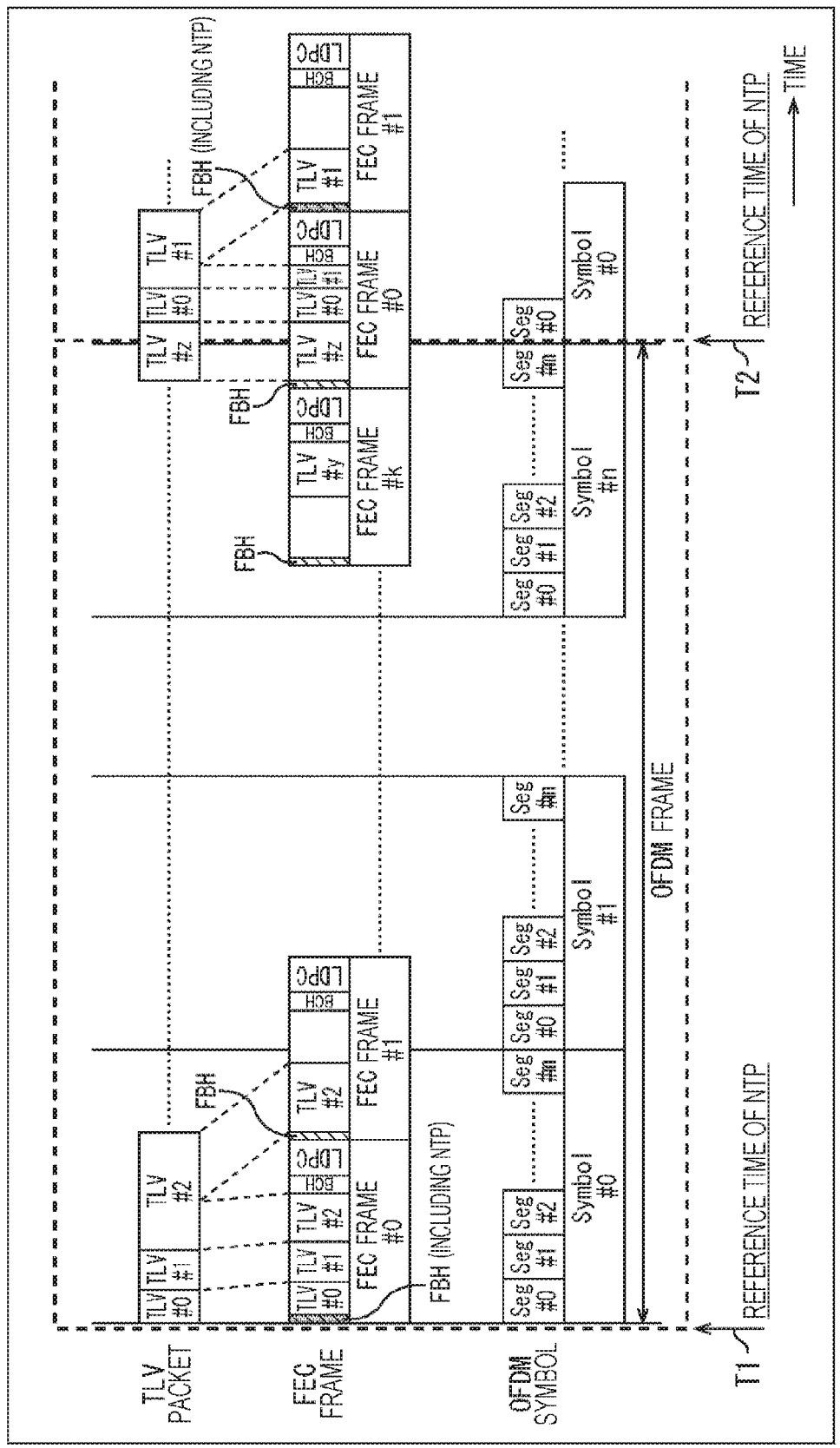
FIG. 7 is a drawing illustrating an example of the sending timing of time information in a first FEC block header method.

FIG. 7 is a drawing illustrating an example of the sending timing of time information used in a case where the first FEC block header method is employed.

FIG. 7 schematically illustrates data that is processed by the data processing device 10 or the transmission device 20 on the transmission side. In addition, in FIG. 7, the horizontal direction represents the time, and the time passes in the horizontal direction from the left side toward the right side in the figure.

The data processing device 10 subjects a UDP/IP packet to required processing to generate a TLV packet. The TLV packet is a variable-length packet, and has a size of, for example, 4 to 65536 bytes. This TLV packet is transmitted from the data processing device 10 to the transmission device 20. It should be noted that the TLV packet is represented as "TLV" in the figure.

The transmission device 20 subjects the TLV packet from the data processing device 10 to required processing to generate an FEC block. Here, the FEC block is generated by adding an FEC block header to one or more TLV packets.

Next, the transmission device 20 subjects the FEC block to required processing to generate an FEC frame. Here, the FEC frame is generated by adding a BCH code and an LDPC code to the FEC block. It should be noted that the FEC block header is represented as "FBH" in the figure, and the BCH code and the LDPC code are represented as "BCH" and "LDPC" respectively in the figure.

Next, the transmission device 20 subjects the FEC frame to required processing to generate an OFDM frame. Here, in a case where the OFDM frame shares the same frame boundary with any of the FEC frames, k+1 pieces of FEC frames ranging from FEC frame #0 to FEC frame #k constitute one OFDM frame. However, in FIG. 7, since the OFDM frame and the FEC frames share no frame boundary, an FEC frame #0 that extends over the next OFDM frame is included.

An OFDM symbol is represented as "Symbol" in the figure. n+1 pieces of OFDM symbols ranging from Symbol #0 to Symbol #n constitute one OFDM frame. In other words, this OFDM frame becomes a unit by which data is transferred as a physical-layer frame.

However, in a case where frequency division multiplexing (FDM) is employed as a broadcast signal multiplexing method, an OFDM symbol is further divided into segments. The segment is represented as "Seg" in the figure. m+1 pieces of segments ranging from Seg #0 to Seg #m constitute one OFDM symbol.

Incidentally, frequency division multiplexing (FDM) is employed as a broadcast signal multiplexing method in the current ISDB-T. However, with respect to the broadcasting method of the next-generation terrestrial digital television broadcasting (next-generation ISDB-T) as well, it is assumed that frequency division multiplexing (FDM) is similarly employed.

Here, with respect to the first FEC block header method, by adding an FEC block header including time information to an FEC block, the time information is inserted into the top area of the top FEC frame among FEC frames that form an OFDM frame.

In FIG. 7, the time information is inserted into an FEC block header of the top FEC frame #0 among FEC frames that form the first OFDM frame.

For example, information of the time prescribed by Network Time Protocol (NTP) is specified as this time information. The time information indicates the time of the start of the first OFDM frame ("reference time of NTP" indicated by an arrow T1 in the figure). It should be noted that in the following explanations, information of the time prescribed by NTP is referred to as "NTP time information".

However, as described above, when a plurality of FEC frames forms one OFDM frame, there is a case where the OFDM frame shares the same frame boundary with any of the FEC frames, and is also a case where the OFDM frame and the FEC frames share no frame boundary.

In a case where the OFDM frame shares the same frame boundary with any of the FEC frames, NTP time information is only required to be inserted into the FEC block header of the top FEC frame among the FEC frames that form the OFDM frame. However, in a case where the OFDM frame and the FEC frames share no frame boundary, it is necessary to adjust the FEC frame into which the NTP time information is inserted.

Paying attention to the first OFDM frame in FIG. 7, data of one FEC frame #0 is partially arranged subsequent to (all data) of k+1 pieces of FEC frames in the first OFDM frame. In addition, paying attention to the second OFDM frame subsequent thereto, subsequent to remaining data of the FEC frame #0, the data of which has been partially arranged in the first OFDM frame, data of FEC frames of the FEC frame #1 or later is arranged in the second OFDM frame.

In other words, the FEC frame #0 is arranged extending over the first OFDM frame, and the second OFDM frame subsequent thereto. In such a case, not the FEC frame #0 that is arranged extending over the OFDM frames, but the FEC frame #1 that is arranged subsequent to the FEC frame #0, is treated as the top FEC frame into which the NTP time information is inserted. In other words, in the second OFDM frame, the FEC frame header of the FEC frame #1 that is treated as the top FEC frame includes the NTP time information, and indicates the time of the start of the second OFDM frame ("reference time of NTP" indicated by an arrow T2 in the figure).

Thus, paying attention to a frame indicated by dotted lines in the figure, in the transmission device 20, NTP time information indicating the time of the start of the OFDM frame is inserted into the FEC block header of the top FEC frame of the OFDM frame. However, there is a case where the OFDM frame shares the same frame boundary with any of the FEC frames, and there is also a case where the OFDM frame and the FEC frames share no frame boundary.

In addition, in a case where the OFDM frame shares the same frame boundary with any of the FEC frames, NTP time information is inserted into the FEC block header of the top FEC frame of the OFDM frame. However, in a case where the OFDM frame and the FEC frames share no frame boundary, an FEC frame subsequent to the FEC frame that extends over the OFDM frame is treated as the top FEC frame, and NTP time information is inserted into the FEC block header thereof.

(Format of FEC Block Header)

Figures 8A, 8B:
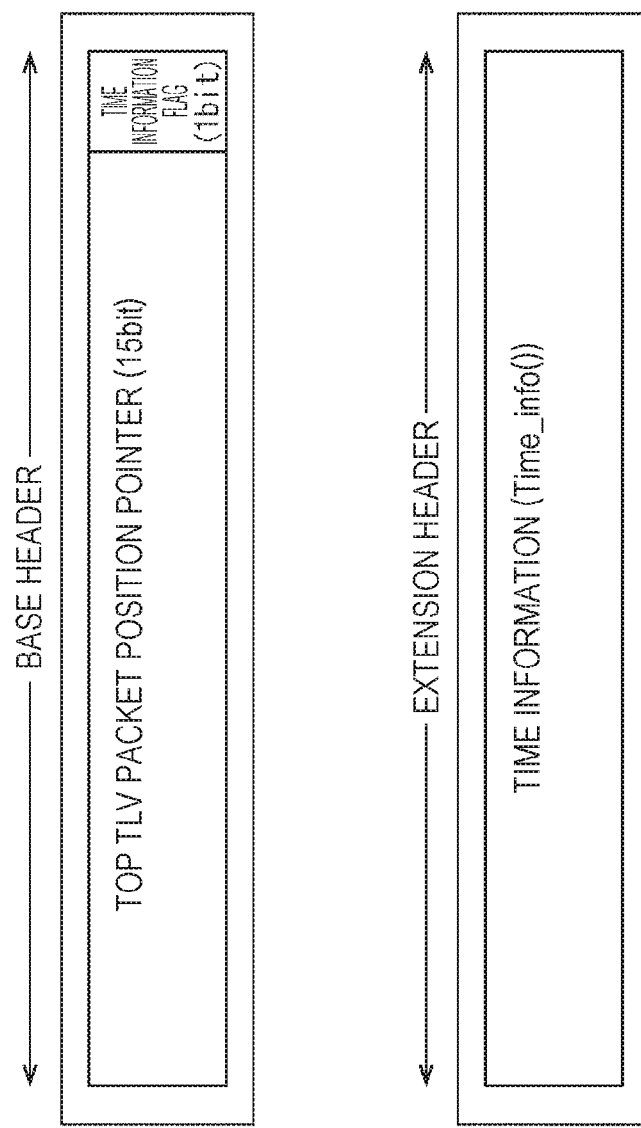
FIGS. 8A, and 8B are drawings illustrating an example of a format of an FEC block header.

FIGS. 8A, and 8B are drawings illustrating an example of a format of an FEC block header used in a case where the first FEC block header method is employed.

FIG. 8A illustrates an example of a format of a base header that forms an FEC block header. In FIG. 8A, the 2-byte base header includes a 15-bit top TLV packet position pointer, and a 1-bit time information flag.

The top TLV packet position pointer is a pointer that indicates a position of a top TLV packet in an FEC block that includes an FEC block header in which the top TLV packet position pointer is arranged. In the base header, 15 bits are reserved for this top TLV packet position pointer, and therefore the top TLV packet position pointer can be used as a pointer having a long code length shown in FIG. 5.

A time information flag (Time_info_Flag) is a flag that indicates whether or not an extension header that includes time information (Time_info) exists. For example, in a case where '0' is specified as the time information flag, it is indicated that there is no extension header that includes time information. In this case, only 2-byte base header is arranged as the FEC block header.

Meanwhile, in a case where '1' is specified as the time information flag, it is indicated that there is an extension header that includes time information. In this case, a predetermined number of bytes (for example, 9 bytes) subsequent to the base header are used as bytes for the extension header, and the extension header that includes time information such as that shown in FIG. 8B is arranged. This time information indicates the absolute time of a starting position in a physical-layer frame (for example, OFDM frame).

(Example of Syntax of Time Information)

FIG. 9 is a drawing illustrating an example of syntax of time information included in the extension header of FIG. 8B.

2-bit leap_indicator is a leap second designator. Using this leap second designator enables to cope with insertion or deletion of a leap second performed at the predetermined time of the adjustment execution date.

The leap second is a second that is added or deleted in order to adjust a difference from UT1, which is the universal time, in universal time coordinated (UTC). For example, Network Time Protocol (NTP) is used to transmit/receive the time by using universal time coordinated (UTC), and therefore requires adjustment of a leap second.

6 bits subsequent to leap_indicator is treated as Reserved for future reservation.

64-bit NTP_transmit_timestamp is information of the time prescribed by NTP (NTP time information). It should be noted that a format of NTP is prescribed in Request for Comments (RFC) by Internet Engineering Task Force (IETF).

Incidentally, in FIG. 9, in a case where unsigned integer most significant bit first (uimsbf) is specified as format, this means that bit operation is performed to be treated as an integer. In addition, in a case where bit string, left bit first (bslbf) is specified, this means being treated as a bit string. These meanings are also similar in FIG. 15 and FIG. 18 described later.

(Flow of Generation of FEC Block)

Figure 10:
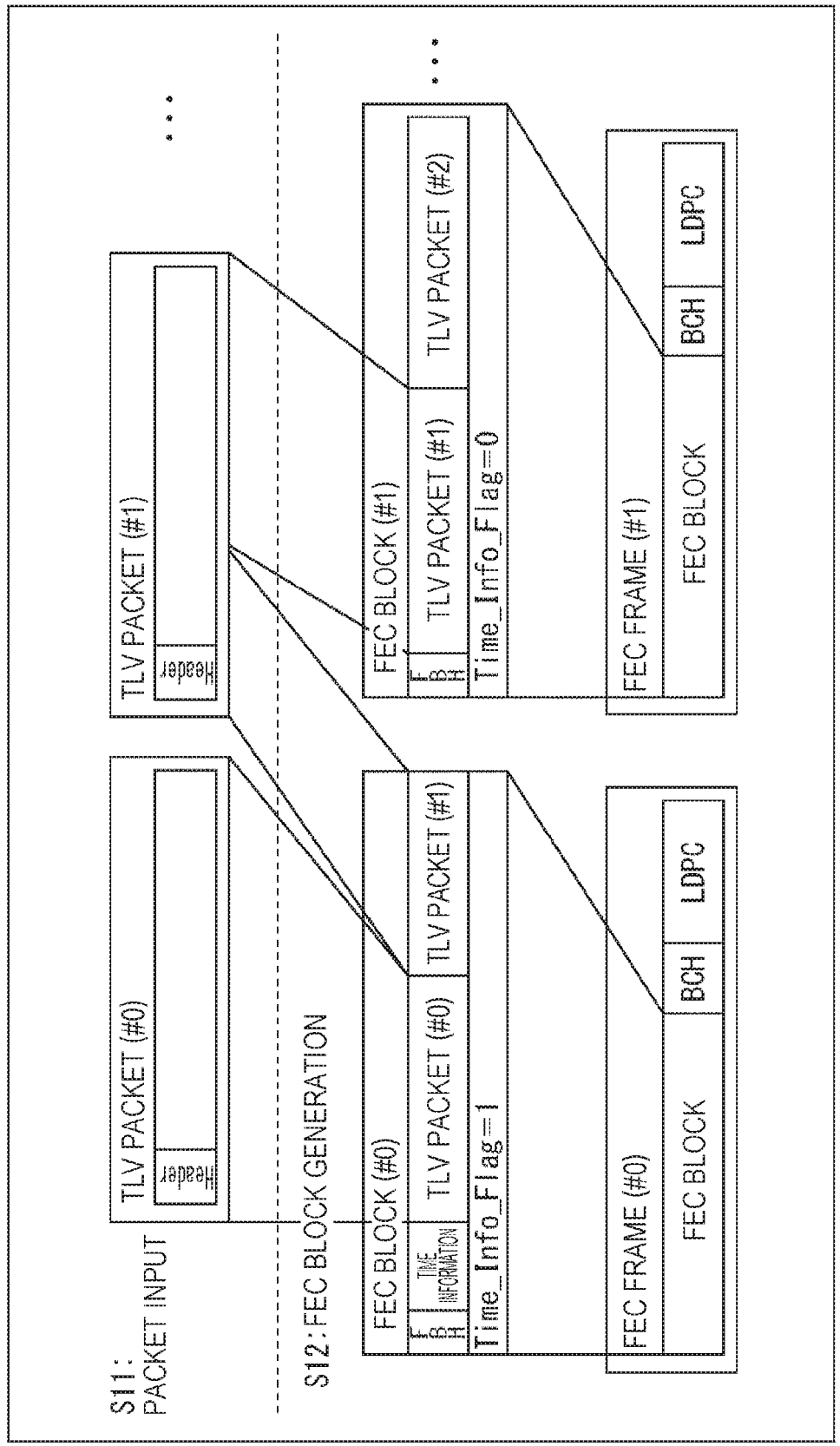
FIG. 10 is a drawing illustrating a flow of generation of an FEC block applied in a case where time information is included.

FIG. 10 is a drawing illustrating a flow of generation of an FEC block applied in a case where time information is included in (an extension header of) an FEC block header. It should be noted that in FIG. 10, the time passes in a direction from the left side toward the right side in the figure.

A TLV packet generated by the TLV packet generation unit 151 (FIG. 3) is input into the FEC block generation unit 153 (FIG. 3) (S11). The FEC block generation unit 153 generates an FEC block by adding an FEC block header to the input TLV packet (S12).

Here, time information such as NTP time information can be included in the FEC block header by using an extension header. It is not always necessary to add this time information to all FEC blocks. The time information can be added to a specific FEC block in arbitrary timing.

For example, in FIG. 10, the FEC block #0 and the FEC block #1 are illustrated as FEC blocks that are successively generated by the processing in the step S12. However, in the top FEC block #0, '1' is specified in the time information flag (Time_info_Flag) of the base header of the FEC block header, and an extension header that includes time information is arranged. Meanwhile, in the FEC block #1, '0' is specified in the time information flag of the base header of the FEC block header, and thus time information is not arranged.

Consequently, time information such as NTP time information can be included in only an FEC block header that is added to an FEC block that forms the top FEC frame among FEC frames that form an OFDM frame.

The first FEC block header method has been explained as above. In this first FEC block header method, by inserting NTP time information into the FEC block header that is added to the FEC block that forms the top FEC frame among FEC frames that form the OFDM frame, efficient transfer of the NTP time information is realized. It should be noted that it is not always necessary to include NTP time information in the top areas of all OFDM frames. The NTP time information may be included, for example, every several frames.

(1-2) Second FEC Block Header Method (Example of the Sending Timing of Time Information)

Figure 11:
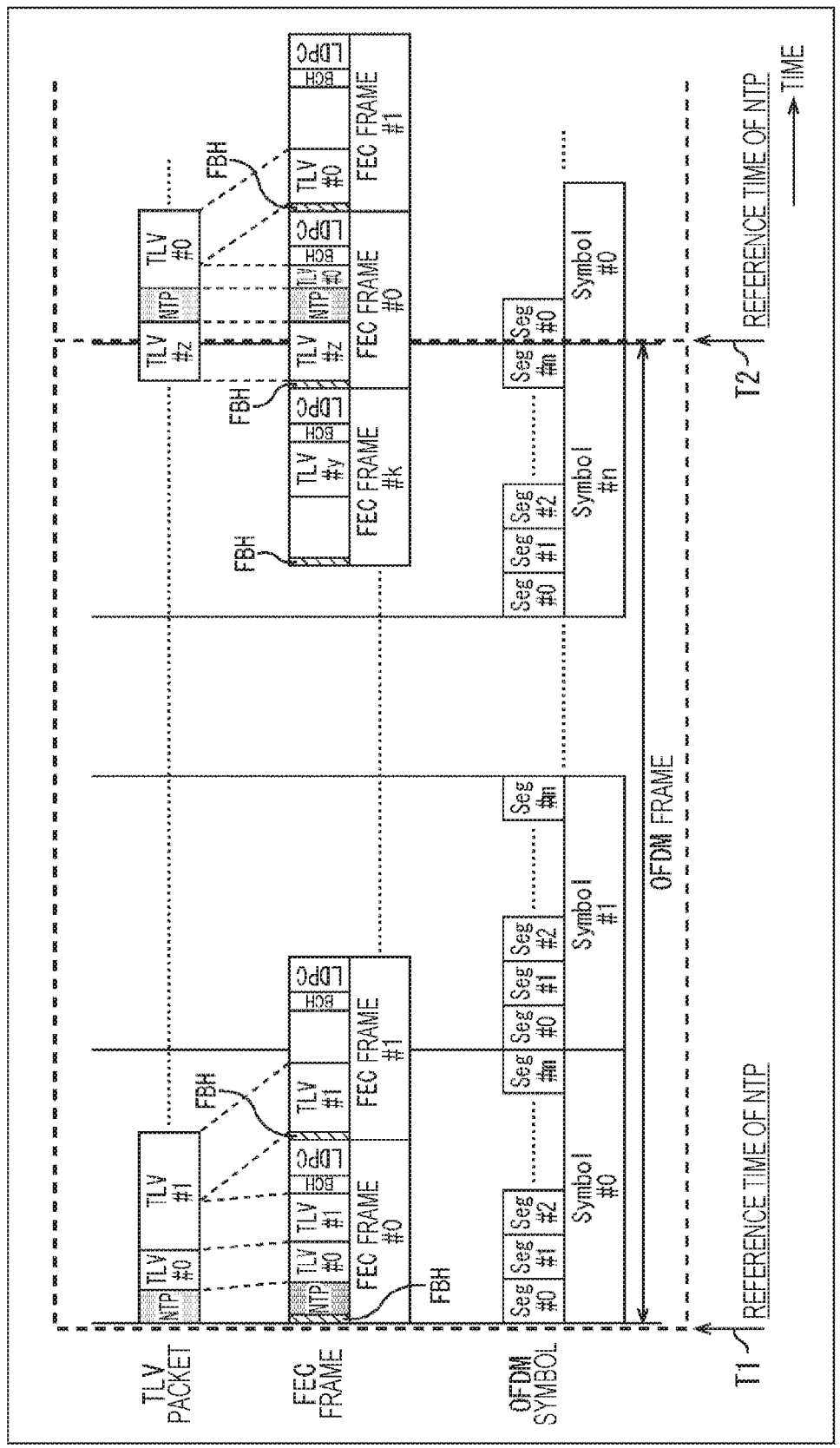
FIG. 11 is a drawing illustrating an example of the sending timing of time information in a second FEC block header method.

FIG. 11 is a drawing illustrating an example of the sending timing of time information used in a case where the second FEC block header method is employed.

In FIG. 11, as with FIG. 7, "TLV" in the figure represents a TLV packet, and "FBH" in the figure represents an FEC block header. An FEC block is generated by adding an FEC block header to one or more TLV packets. In addition, "BCH" and "LDPC" in the figure represent a BCH code and an LDPC code respectively, and an FEC frame is generated by adding a BCH code and an LDPC code to the FEC block.

In addition, in FIG. 11, as with FIG. 7, "Symbol" in the figure represents an OFDM symbol, and "Seg" in the figure represents a segment. m+1 pieces of segments constitute one OFDM symbol, and n+1 pieces of OFDM symbols constitute one OFDM frame.

Here, with respect to the second FEC block header method, by including NTP time information not in an FEC block header but in a TLV packet, the NTP time information is inserted into the top area of the top FEC frame among FEC frames that form an OFDM frame. In addition, in the FEC block header of the top FEC frame, the top TLV packet includes a flag indicating that NTP time information is included (time information flag described later in FIG. 12).

In FIG. 11, time information such as NTP time information is inserted into the top TLV packet (an immediately preceding TLV packet of the TLV packet #0) in the top FEC frame #0 among FEC frames that form the first OFDM frame. The NTP time information is represented as "NTP" in the figure. This NTP time information represents the time of the start of the first OFDM frame ("reference time of NTP" indicated by an arrow T1 in the figure).

However, as described above, when a plurality of FEC frames forms one OFDM frame, there is a case where the OFDM frame shares the same frame boundary with any of the FEC frames, and is also a case where the OFDM frame and the FEC frames share no frame boundary.

In a case where the OFDM frame shares the same frame boundary with any of the FEC frames, NTP time information is only required to be inserted into the top TLV packet in the top FEC frame among the FEC frames that form the OFDM frame. However, in a case where the OFDM frame and the FEC frames share no frame boundary, it is necessary to adjust the TLV packet into which the NTP time information is inserted.

Paying attention to the first OFDM frame in FIG. 11, data of one FEC frame #0 is partially arranged subsequent to (all data) of k+1 pieces of FEC frames in the first OFDM frame. In addition, paying attention to the second OFDM frame subsequent thereto, subsequent to remaining data of the FEC frame #0, the data of which has been partially arranged in the first OFDM frame, data of FEC frames of the FEC frame #1 or later is arranged in the second OFDM frame.

In other words, the FEC frame #0 is arranged extending over the first OFDM frame, and the second OFDM frame subsequent thereto. In such a case, not the TLV packet #Z that is arranged extending over the OFDM frames, but a TLV packet that is arranged subsequent thereto (an immediately preceding TLV packet of the TLV packet #0) is treated as the top TLV packet into which the NTP time information is inserted. In other words, the TLV packet (the top TLV packet) subsequent to the TLV packet #Z in the FEC frame #0 includes the NTP time information, which indicates the time of the start of the second OFDM frame ("reference time of NTP" indicated by an arrow T2 in the figure).

(Format of FEC Block Header)

Figure 12:
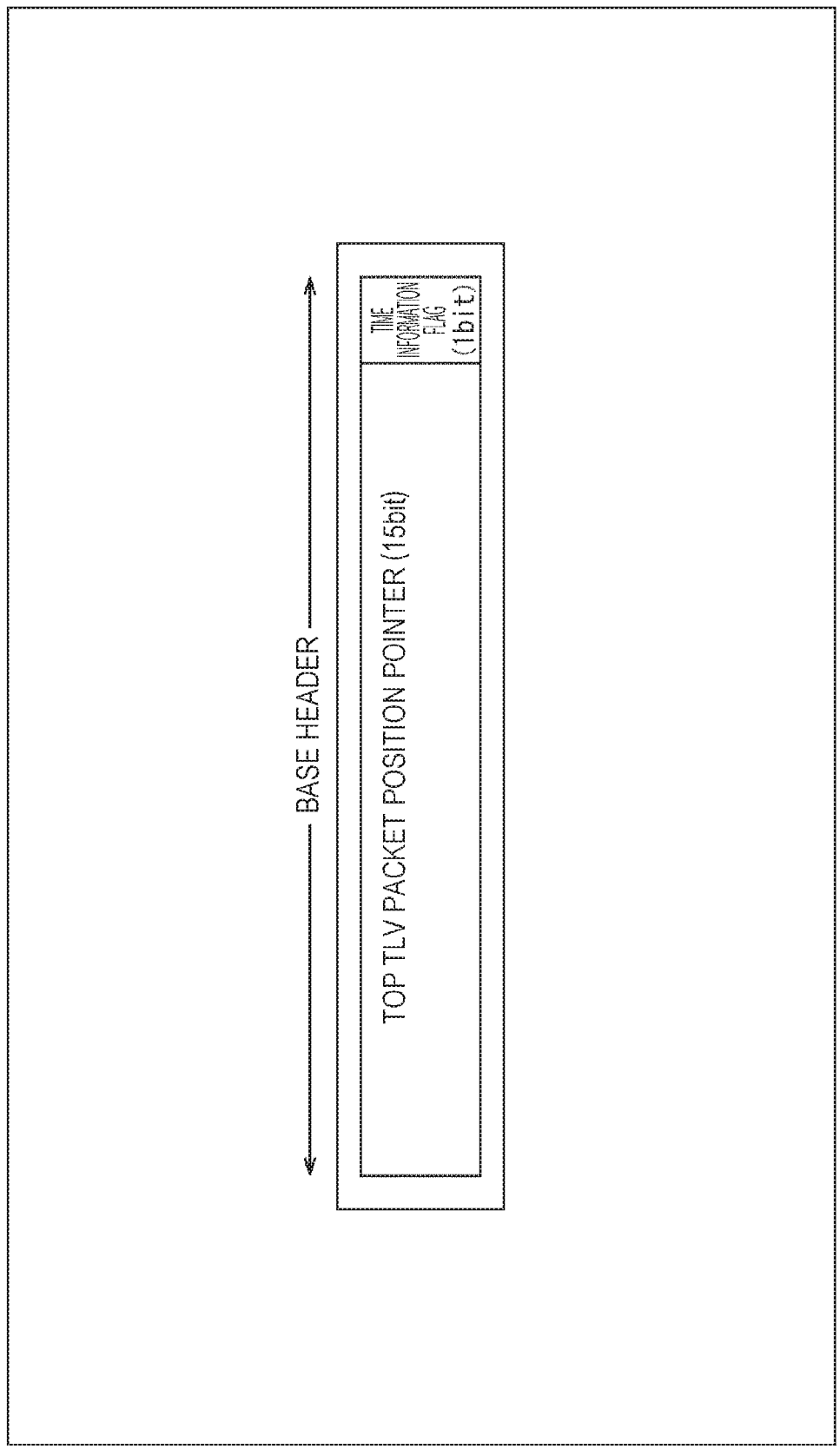
FIG. 12 is a drawing illustrating an example of a format of an FEC block header.

FIG. 12 is a drawing illustrating an example of a format of an FEC block header used in a case where the second FEC block header method is employed.

FIG. 12 illustrates an example of a format of a base header that forms an FEC block header. In FIG. 12, the 2-byte base header includes a 15-bit top TLV packet position pointer, and a 1-bit time information flag. Meaning of the top TLV packet position pointer has been described above.

The time information flag is a flag indicating whether or not a TLV packet that includes time information exists.

For example, in a case where '0' is specified as the time information flag, it is indicated that in the OFDM frame, time information is not inserted into the top TLV packet in the FEC frame. Meanwhile, in a case where '1' is specified as the time information flag, it is indicated that in the OFDM frame, time information is inserted into the top TLV packet in the FEC frame.

However, in a case where the OFDM frame and the FEC frames share no frame boundary, it is indicated that time information is inserted into not a TLV packet that extends over a frame boundary of the frames, but into the next TLV packet subsequent to the TLV packet.

The second FEC block header method has been explained as above. In this second FEC block header method, by inserting NTP time information into the top TLV packet according to the time information flag included in the FEC block header that is added to the FEC block that forms the top FEC frame among FEC frames that form the OFDM frame, efficient transfer of the NTP time information is realized. It should be noted that it is not always necessary to include NTP time information in the top areas of all OFDM frames. The NTP time information may be included, for example, every several frames.

(2) OFDM Frame Header Method

As the OFDM frame header method in which time information is transferred by using an OFDM frame header, there are a method in which time information is included in an OFDM frame header, and a method in which time information is included in a TLV packet. Hereinafter, the former is referred to as a first OFDM frame header method, and the latter is referred to as a second OFDM frame header method. The first and second OFDM frame header methods will be described in order.

(2-1) First OFDM Frame Header Method (Example of the Sending Timing of Time Information)

Figure 13:
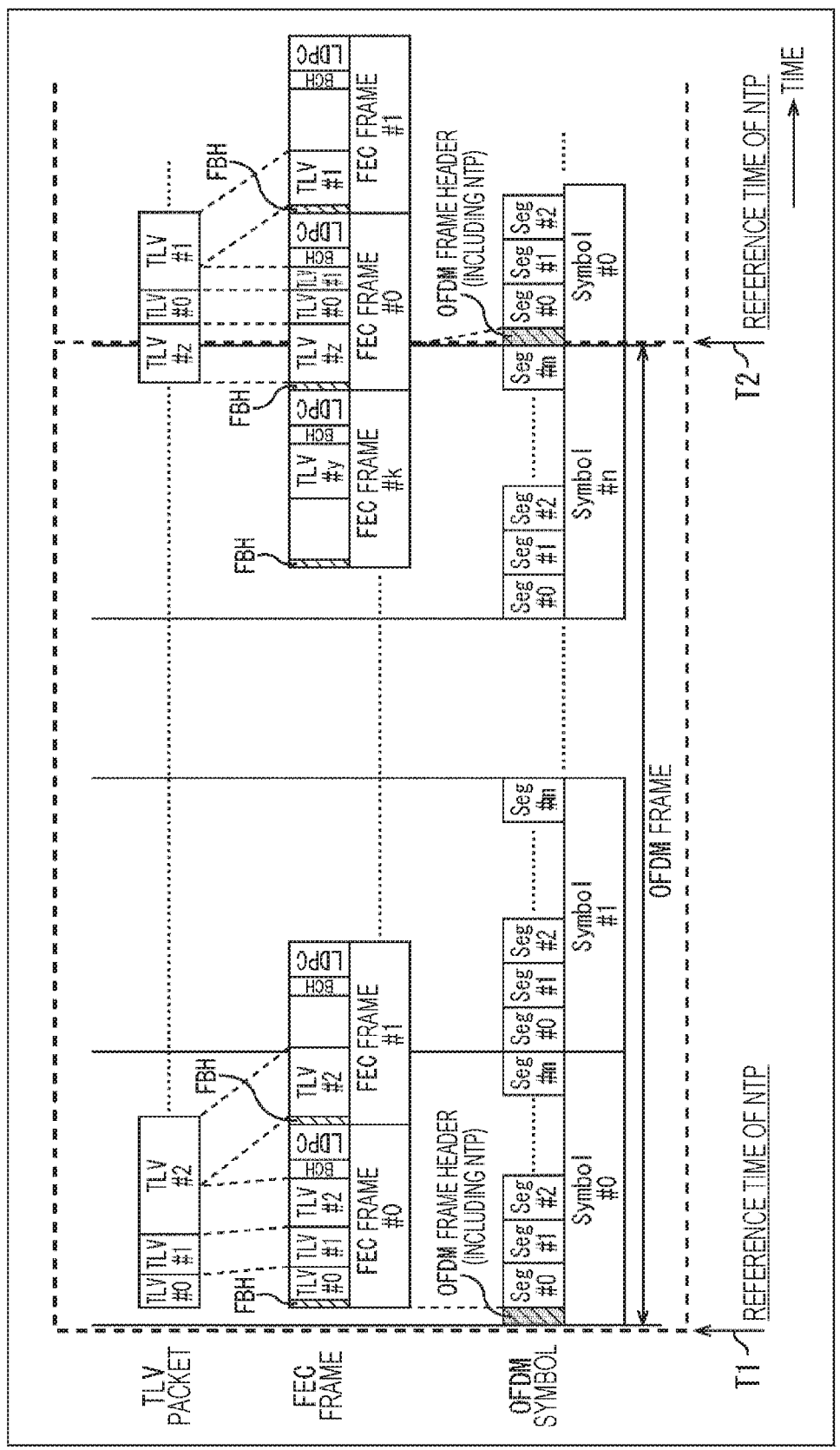
FIG. 13 is a drawing illustrating an example of the sending timing of time information in a first OFDM frame header method.

FIG. 13 is a drawing illustrating an example of the sending timing of time information used in a case where the first OFDM frame header method is employed.

In FIG. 13, as with FIGS. 7 and 11, "TLV" in the figure represents a TLV packet, and "FBH" in the figure represents an FEC block header. An FEC block is generated by adding an FEC block header to one or more TLV packets. In addition, "BCH" and "LDPC" in the figure represent a BCH code and an LDPC code respectively, and an FEC frame is generated by adding a BCH code and an LDPC code to the FEC block.

In addition, in FIG. 13, as with FIGS. 7 and 11, "Symbol" in the figure represents an OFDM symbol, and "Seg" in the figure represents a segment. m+1 pieces of segments constitute one OFDM symbol, and n+1 pieces of OFDM symbols constitute one OFDM frame.

Here, in the first OFDM frame header method, by adding an OFDM frame header that includes NTP time information to an OFDM frame, the NTP time information is inserted into the top area of the OFDM frame. This NTP time information represents the time of the start of the first OFDM frame ("reference time of NTP" indicated by an arrow T1 in the figure).

Incidentally, as described above, when a plurality of FEC frames forms one OFDM frame, there is a case where the OFDM frame shares the same frame boundary with any of the FEC frames, and is also a case where the OFDM frame and the FEC frames share no frame boundary. However, in the first OFDM frame header method, the NTP time information is included in the OFDM frame header of the OFDM frame. Therefore, NTP time information can be always included in an OFDM frame header regardless of whether or not those frames share the same frame boundary.

(Format of OFDM Frame Header)

Figure 14:
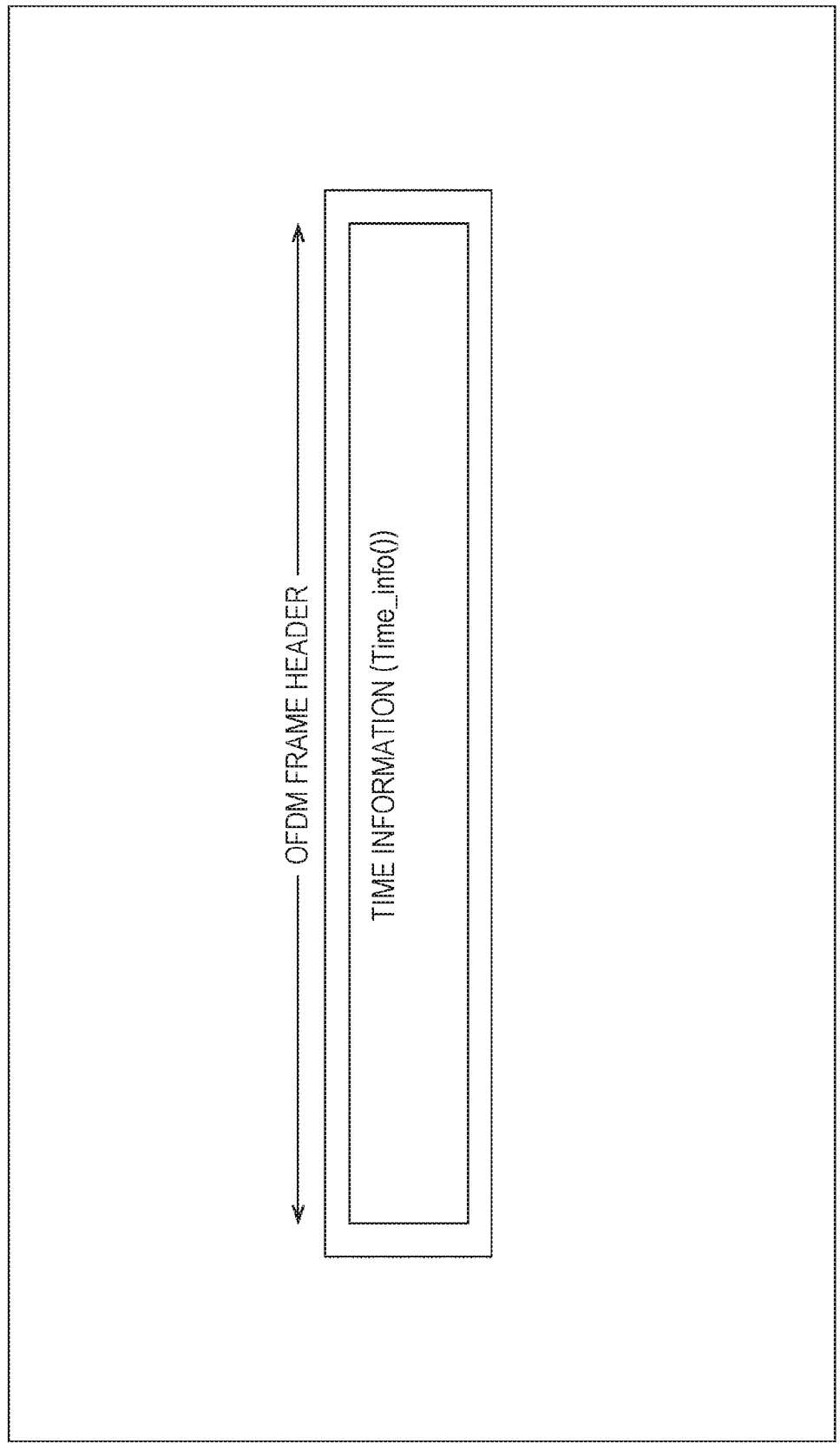
FIG. 14 is a drawing illustrating an example of a format of an OFDM frame header.

FIG. 14 is a drawing illustrating an example of a format of an OFDM frame header used in a case where the first OFDM frame header method is employed.

In FIG. 14, the OFDM frame header includes time information (Time_info) having a predetermined number of bits. FIG. 15 shows an example of syntax of the time information included in the OFDM frame header of FIG. 14.

1-bit Time_Info_Flag is a flag indicating whether or not time information is included.

For example, in a case where '0' is specified as the time information flag, it is indicated that time information is not inserted into the OFDM frame header. Meanwhile, in a case where '1' is specified as the time information flag, it is indicated that time information is inserted into the OFDM frame header.

2-bit leap_indicator is a leap second designator. Using this leap second designator enables to cope with insertion or deletion of a leap second performed at the predetermined time of the adjustment execution date.

64-bit NTP_transmit_timestamp is NTP time information. This NTP time information represents the absolute time of a starting position in the OFDM frame.

It should be noted that in the syntax shown in FIG. 15, byte alignment may be enabled by adding 5-bit Reserved.

The first OFDM frame header method has been described above. In this first OFDM frame header method, by inserting NTP time information into the OFDM frame header that is added to the OFDM frame, efficient transfer of the NTP time information is realized. It should be noted that it is not always necessary to include NTP time information in the top areas of all OFDM frames. The NTP time information may be included, for example, every several frames.

(2-2) Second OFDM Frame Header Method (Example of the Sending Timing of Time Information)

Figure 16:
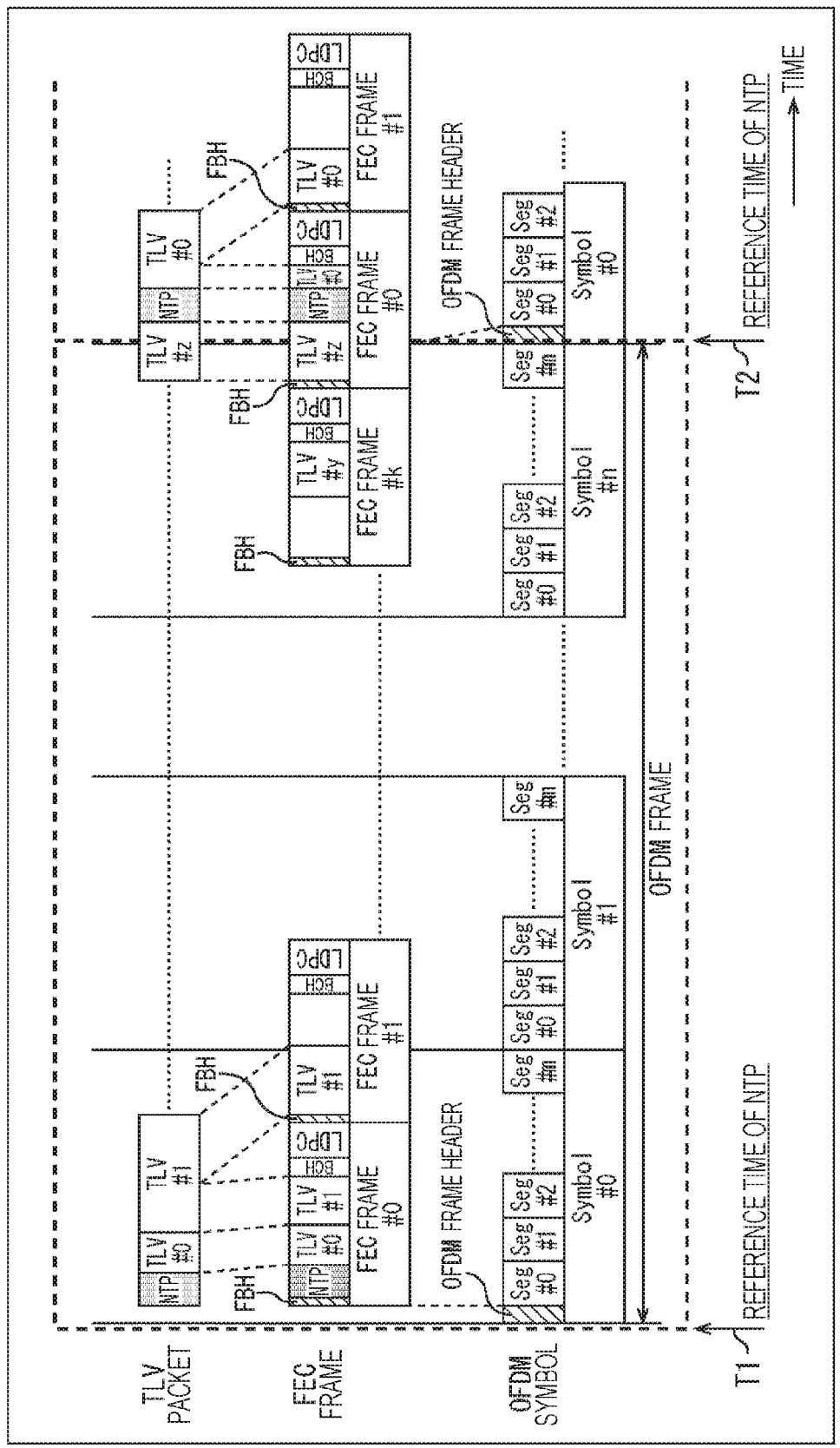
FIG. 16 is a drawing illustrating an example of the sending timing of time information in a second OFDM frame header method.

FIG. 16 is a drawing illustrating an example of the sending timing of time information used in a case where the second OFDM frame header method is employed.

In FIG. 16, as with FIGS. 7, 11 and 13, "TLV" in the figure represents a TLV packet, and "FBH" in the figure represents an FEC block header. An FEC block is generated by adding an FEC block header to one or more TLV packets. In addition, "BCH" and "LDPC" in the figure represent a BCH code and an LDPC code respectively, and an FEC frame is generated by adding a BCH code and an LDPC code to the FEC block.

In addition, in FIG. 16, as with FIGS. 7, 11 and 13, "Symbol" in the figure represents an OFDM symbol, and "Seg" in the figure represents a segment. m+1 pieces of segments constitute one OFDM symbol, and n+1 pieces of OFDM symbols constitute one OFDM frame.

Here, in the second OFDM frame header method, by including NTP time information not in an OFDM frame header but in a TLV packet, the NTP time information is inserted into the top area of the OFDM frame. In addition, the OFDM frame header includes a flag (time information flag described later in FIG. 18) indicating that NTP time information is included.

In FIG. 16, time information such as NTP time information is inserted into the top TLV packet (an immediately preceding TLV packet of the TLV packet #0) in the top FEC frame #0 among FEC frames that form the first OFDM frame. The NTP time information is represented as "NTP" in the figure. This NTP time information represents the time of the start of the first OFDM frame ("reference time of NTP" indicated by an arrow T1 in the figure).

However, as described above, when a plurality of FEC frames forms one OFDM frame, there is a case where the OFDM frame shares the same frame boundary with any of the FEC frames, and is also a case where the OFDM frame and the FEC frames share no frame boundary.

In a case where the OFDM frame shares the same frame boundary with any of the FEC frames, NTP time information is only required to be inserted into the top TLV packet in the top FEC frame among the FEC frames that form the OFDM frame. However, in a case where the OFDM frame and the FEC frames share no frame boundary, it is necessary to adjust the TLV packet into which the NTP time information is inserted.

In FIG. 16, as with FIG. 11, the FEC frame #0 is arranged extending over the first OFDM frame, and the second OFDM frame subsequent thereto. In such a case, not the TLV packet #Z that is arranged extending over the OFDM frames, but a TLV packet that is arranged subsequent thereto (an immediately preceding TLV packet of the TLV packet #0) is treated as the top TLV packet into which the NTP time information is inserted. In other words, the TLV packet (the top TLV packet) subsequent to the TLV packet #Z in the FEC frame #0 includes the NTP time information, which indicates the time of the start of the second OFDM frame ("reference time of NTP" indicated by an arrow T2 in the figure).

(Format of OFDM Frame Header)

Figure 17:
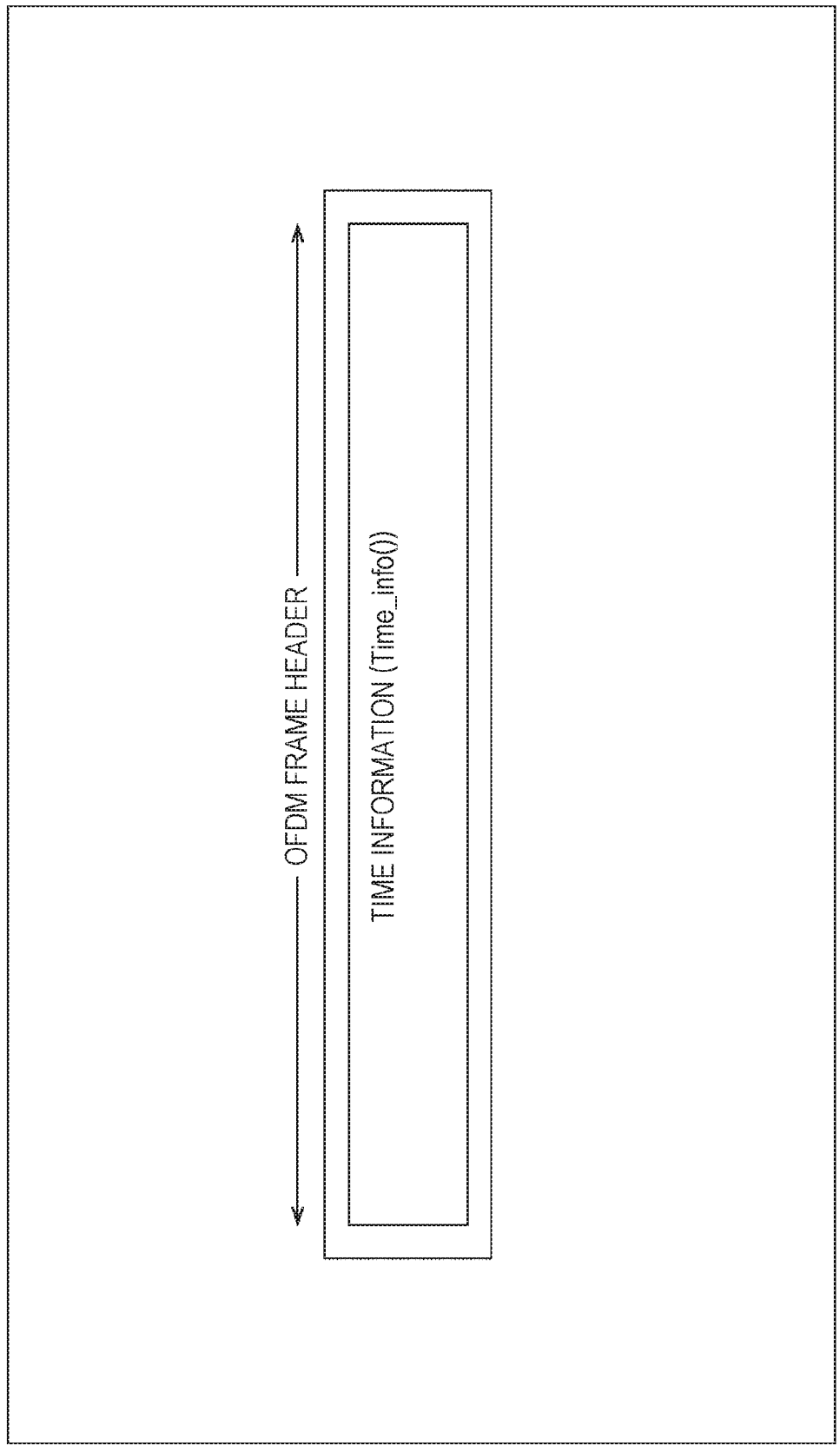
FIG. 17 is a drawing illustrating an example of a format of an OFDM frame header.

FIG. 17 is a drawing illustrating an example of a format of an OFDM frame header used in a case where the second OFDM frame header method is employed.

In FIG. 17, the OFDM frame header includes time information (Time_Info) having a predetermined number of bits. FIG. 18 shows an example of syntax of the time information included in the OFDM frame header of FIG. 17.

1-bit Time_Info_Flag is a flag indicating whether or not time information is included.

For example, in a case where '0' is specified as the time information flag, it is indicated that in the OFDM frame, time information is not inserted into the top TLV packet in the top FEC frame. Meanwhile, in a case where '1' is specified as the time information flag, it is indicated that in the OFDM frame, time information is inserted into the top TLV packet in the top FEC frame.

However, in a case where the OFDM frame and the FEC frames share no frame boundary, it is indicated that time information is inserted into not a TLV packet that extends over a frame boundary of the frames, but into the next TLV packet subsequent to the TLV packet.

The second OFDM frame header method has been described above. In this second OFDM frame header method, by inserting NTP time information into the top TLV packet in the FEC block forming the top FEC frame among FEC frames that form the OFDM frame according to the time information flag included in the OFDM frame header added to the OFDM frame, efficient transfer of the NTP time information is realized. It should be noted that it is not always necessary to include NTP time information in the top areas of all OFDM frames. The NTP time information may be included, for example, every several frames.

4. Operation on the Transmission Side (Flow of Transmission Processing)

Figure 19:
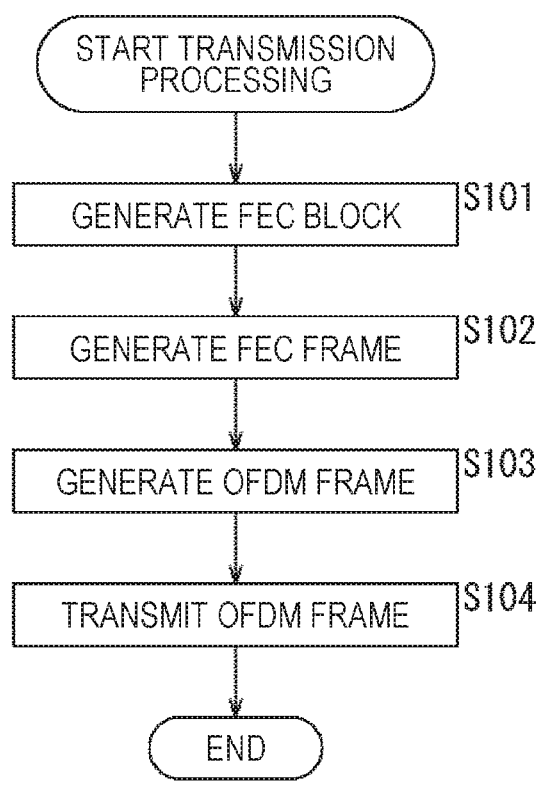
FIG. 19 is a flowchart illustrating a flow of transmission processing.

Next, a flow of transmission processing executed by a device on the transmission side will be described with reference to a flowchart shown in FIG. 19.

In a step S101, an FEC block generation unit 153 generates an FEC block by processing a TLV packet that is input into the FEC block generation unit 153.

Here, in a case where the first FEC block header method is employed, the FEC block is generated in such a manner that NTP time information is included in an FEC block header that is added to an FEC block in the top FEC frame among FEC frames that form an OFDM frame.

In addition, in a case where the second FEC block header method is employed, an FEC block is generated by processing a TLV packet in such a manner that NTP time information is included in the top TLV packet in the top FEC frame among FEC frames that form an OFDM frame. In this case, an FEC block header of the FEC block includes a time information flag indicating that NTP time information is included in the top TLV packet.

In addition, in a case where the second OFDM frame header method is employed, an FEC block is generated by processing a TLV packet in such a manner that NTP time information is included in the top TLV packet in the top FEC frame among FEC frames that form an OFDM frame.

In a step S102, the FEC frame generation unit 154 generates an FEC frame by processing the FEC block obtained by the processing in the step S101.

In a step S103, the data processing unit 211 generates an OFDM frame by processing the FEC frame obtained by the processing in the step S102.

Here, in a case where the first OFDM frame header method is employed, the OFDM frame is generated in such a manner that NTP time information is included in an OFDM frame header added to the OFDM frame.

In addition, in a case where the second OFDM frame header method is employed, the OFDM frame header of the OFDM frame includes a time information flag indicating that NTP time information is included in the top TLV packet in the top FEC frame.

In a step S103, the modulation unit 212 transmits (a broadcast signal corresponding to) an OFDM frame by processing the OFDM frame obtained by the processing in the step S103.

The flow of the transmission processing has been described above.

5. Modified Examples (Application to Other Broadcasting Methods)

In the above explanation, as a broadcasting method of digital television broadcasting, the focus is placed on Integrated Services Digital Broadcasting (ISDB) that is a method employed in Japan and the like. However, the present technology may be applied to, for example, Advanced Television Systems Committee (ATSC) that is a method employed in the United States and the like, or Digital Video Broadcasting (DVB) that is a method employed in each country of Europe and the like.

In addition, as a broadcasting method of digital television broadcasting, the present technology can also be applied not only to terrestrial broadcasting, but also to a method including satellite broadcasting that uses a broadcasting satellite (BS), a communication satellite (CS) or the like, and cable broadcasting such as cable television (CATV).

(Other Examples of Packet and Signaling)

In addition, the above-described names such as packet, frame, and signaling (control information) are merely examples, and accordingly there is a case where other names are used. However, these differences in names are formal difference, and therefore substantial contents of target packet, frame, signaling or the like do not differ.

For example, the TLV packet is an example of a transfer packet, and the transfer packet includes, for example, an ATSC Link-Layer Protocol (ALP) packet that is a variable-length packet, a Generic Stream Encapsulation (GSE) packet or the like. It should be noted that there is a case where frame and packet are used in the same meaning.

(Other Examples of Time Information)

In the above explanation, a case where the information of the time prescribed by NTP (NTP time information) is used has been explained as time information. However, time information is not limited to this. For example, it is possible to use arbitrary time information including information of the time prescribed by Precision Time Protocol (PTP) or Third Generation Partnership Project (3GPP), time information included in Global Positioning System (GPS) information, and time information having other independently determined formats.

In addition, in the above explanation, it has been explained that the NTP time information represents the time of a starting position of an OFDM frame. However, the time represented by time information such as the NTP time information is not limited to the time of the starting position of the OFDM frame. The absolute time of a predetermined position in a stream of a physical-layer frame such as an OFDM frame can also be represented.

(Other Examples of Transfer Path)

In addition, the present technology can also be applied to a transfer path that differs from the broadcast transfer path as a transfer path, in other words, the present technology can also be applied to, for example, a predetermined method (a method other than the broadcasting method of digital television broadcasting) prescribed on the assumption that, for example, a communication transfer path such as a mobile communication network is used. In this case, a communication transfer path such as a mobile communication network is used as a transfer path of the transfer system 1 (FIG. 1), and the functions of the data processing device 10 and the transmission device 20 are provided by, for example, a communication apparatus in a base station. Accordingly, the communication apparatus communicates with the receiving device 30 (for example, a mobile receiver) having a communication function through a communication transfer path such as a mobile communication network or the like.

6. Configuration of Computer

Figure 20:
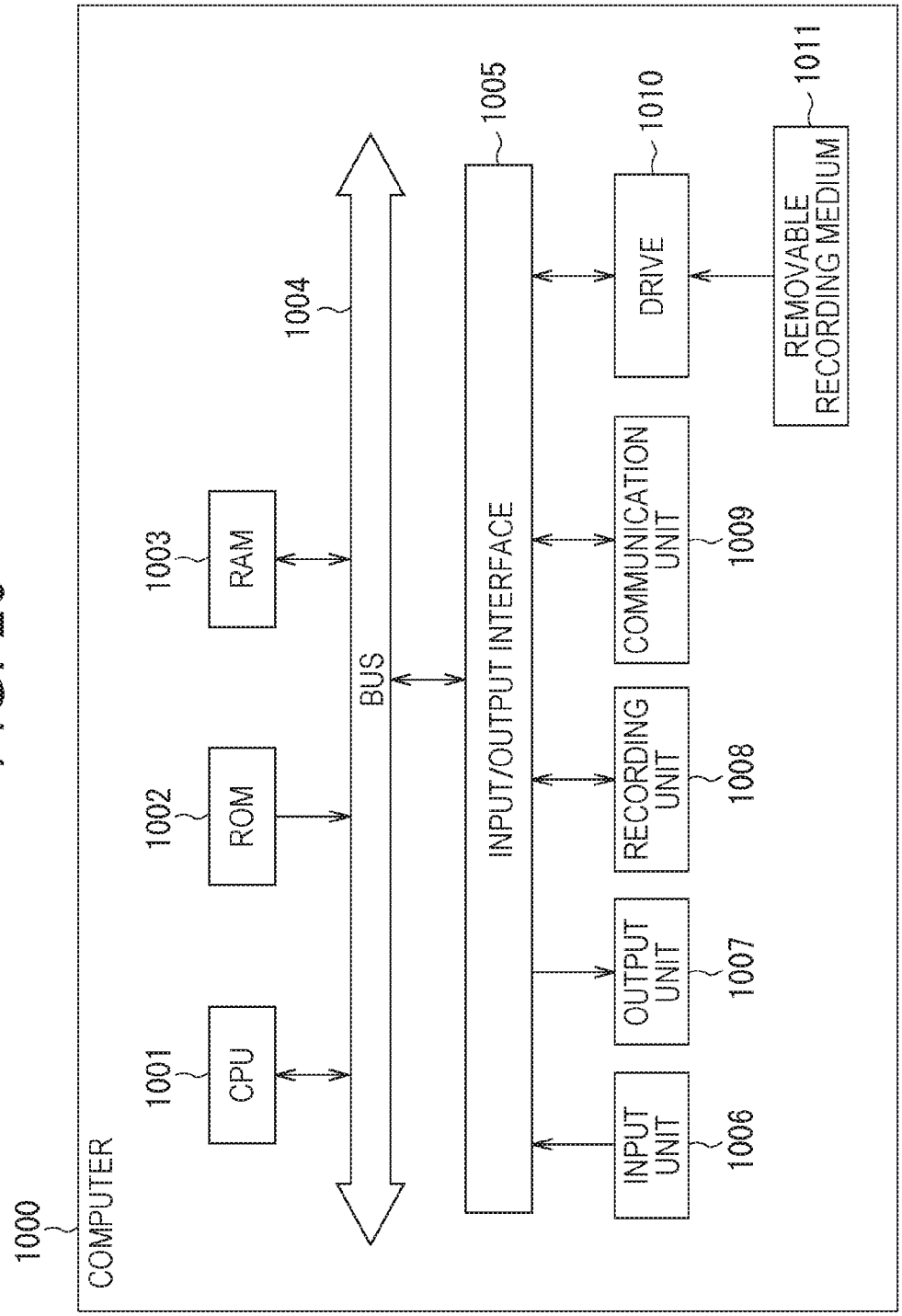
FIG. 20 is a diagram illustrating a configuration example of a computer.

The above-described series of processing can be executed by hardware, and can also be executed by software. In a case where the series of processing is executed by software, a program that configures the software is installed in a computer. FIG. 20 is a diagram illustrating a hardware configuration example of a computer that executes the above-described series of processing by a program.

In a computer 1000, a central processing unit (CPU) 1001, a read only memory (ROM) 1002, and a random access memory (RAM) 1003 are mutually connected through a bus 1004. An input-output interface 1005 is further connected to the bus 1004. An input unit 1006, an output unit 1007, a recording unit 1008, a communication unit 1009, and a drive 1010 are connected to the input-output interface 1005.

The input unit 1006 includes a keyboard, a mouse, and a microphone. The output unit 1007 includes a display, and a speaker. The recording unit 1008 includes a hard disk, and a nonvolatile memory. The communication unit 1009 includes a network interface. The drive 1010 drives a removable recording media 1011 such as a magnetic disk, an optical disk, a magneto-optical disk, or a semiconductor memory.

In the computer 1000 that is configured as described above, the CPU 1001 loads a program stored in the ROM 1002 or the recording unit 1008 into the RAM 1003 through the input-output interface 1005 and the bus 1004, then executes the program, and consequently the above-described series of processing is performed.

The program executed by the computer 1000 (CPU 1001) can be provided by being recorded, for example, in a removable recording medium 1011 serving as a package media or the like. In addition, the program can be provided through a wired or wireless transmission medium such as a local area network, Internet, and digital satellite broadcasting.

In the computer 1000, the program can be installed in the recording unit 1008 through the input-output interface 1005 by mounting the removable recording medium 1011 to the drive 1010. In addition, the program can be received by the communication unit 1009 through a wired or wireless transmission medium, and can be installed in the recording unit 1008. Besides the above, the program can be installed in the ROM 1002 or the recording unit 1008 beforehand.

Here, in the present description, processing executed by the computer according to the program is not always required to be time-sequentially executed along the order described as the flowchart. In other words, the processing executed by the computer according to the program also includes processing that is executed in parallel or individually (for example, parallel processing or processing by an object). In addition, the program may be processed by one computer (processor), or may be subjected to distributed processing by a plurality of computers.

It should be noted that embodiments of the present technology are not limited to the embodiments described above, and various modifications can be made within the scope that does not deviate from the gist of the present technology.

In addition, the present technology can employ the following configurations.

(1)

A transmission device including:

a generation unit that generates a physical-layer frame on the basis of a forward error correction (FEC) frame obtained from input data; and a transmission unit that transmits the physical-layer frame, in which a top area of the physical-layer frame includes time information indicating time of a starting position of the top area.

(2)

The transmission device set forth in the preceding (1), in which an FEC block that includes a type-length value (TLV) packet forms the FEC frame, and according to a first header added to an FEC block that forms a top FEC frame among FEC frames that form the physical-layer frame, the time information is included in a top area in the top FEC frame.

(3)

The transmission device set forth in the preceding (2), in which the time information is included in the first header.

(4)

The transmission device set forth in the preceding (2), in which according to a flag indicating whether or not the time information included in the first header exists, the time information is included in a top TLV packet in the FEC block that forms the top FEC frame.

(5)

The transmission device set forth in the preceding (1), in which an FEC block that includes a TLV packet forms the FEC frame, and according to a second header added to the physical-layer frame, the time information is included in the top area of the physical-layer frame.

(6)

The transmission device set forth in the preceding (5), in which the time information is included in the second header.

(7)

The transmission device set forth in the preceding (5), in which according to a flag indicating whether or not the time information included in the second header exists, the time information is included in the top TLV packet in the FEC block that forms the top FEC frame among FEC frames that form the physical-layer frame.

(8)

The transmission device set forth in any of the preceding (1) to (7), in which the time information includes information of time prescribed by Network Time Protocol (NTP).

(9)

The transmission device set forth in any of the preceding (1) to (8), in which the physical-layer frame includes an orthogonal frequency division multiplexing (OFDM) frame that uses an orthogonal frequency division multiplexing method as a modulation method.

(10)

A transmission method of a transmission device, the transmission method including the steps of causing the transmission device to:

generate a physical-layer frame on the basis of an FEC frame obtained from input data; and transmit the physical-layer frame, in which a top area of the physical-layer frame includes time information indicating time of a starting position of the top area.

REFERENCE SIGNS LIST

1 Transfer system
10, 10-1 to 10-N Data processing device
20 Transmission device
30, 30-1 to 30-M Receiving device
40, 40-1 to 40-N Communication line
50 Broadcast transfer path
111 Component processing unit
112 Signaling generation unit
113 Multiplexer
114 Data processing unit
151 TLV packet generation unit
152 TS packet processing unit
153 FEC block generation unit
154 FEC frame generation unit
211 Data processing unit
212 Modulation unit
1000 Computer
1001 CPU

The invention claimed is:

1. A transmission device, comprising:
a generation unit configured to generate a physical-layer frame based on a plurality of forward error correction (FEC) frames, wherein the plurality of FEC frames is based on input data; and
a transmission unit configured to transmit the physical-layer frame, wherein
a predetermined FEC frame of the plurality of FEC frames includes time information, and
the time information indicates time of a starting position of the physical-layer frame.

2. The transmission device according to claim 1, wherein
the physical-layer frame includes the plurality of FEC frames,
the predetermined FEC frame comprises a header and an FEC block,
the FEC block includes a plurality of type-length value (TLV) packets, and
the predetermined FEC frame is a first FEC frame among the plurality of FEC frames.

3. The transmission device according to claim 2, wherein the header includes the time information.

4. The transmission device according to claim 2, wherein
based on a value of a flag, a predetermined TLV packet of the plurality of TLV packets includes the time information,
the value of the flag indicates availability of the time information in the header, and
the predetermined TLV packet is a first TLV packet among the plurality of TLV packets.

5. The transmission device according to claim 1, wherein
the predetermined FEC frame includes an FEC block,
the FEC block includes a plurality of type-length value (TLV) packets, and
the physical-layer frame includes a header.

6. The transmission device according to claim 5, wherein the header includes the time information.

7. The transmission device according to claim 5, wherein
based on a value of a flag, a predetermined TLV packet of the plurality of TLV packets includes the time information,
the value of the flag indicates availability of the time information in the header, and
the predetermined TLV packet is a first TLV packet among the plurality of TLV packets.

8. The transmission device according to claim 1, wherein
the time information includes information of time prescribed by Network Time Protocol (NTP).

9. The transmission device according to claim 1, wherein
the physical-layer frame includes an orthogonal frequency division multiplexing (OFDM) frame, and
a modulation method associated with the OFDM frame is an orthogonal frequency division multiplexing method.

10. The transmission device according to claim 1, wherein the time of the starting position of the physical-layer frame corresponds to absolute time of the starting position.

11. A transmission method, comprising:
in a transmission device:
generating a physical-layer frame based on a plurality of forward error correction (FEC) frames, wherein the plurality of FEC frames is based on input data; and
transmitting the physical-layer frame, wherein
a predetermined FEC frame of the plurality of FEC frames includes time information, and
the time information indicates time of a starting position of the physical-layer frame.

* * * * *